US012236651B2

(12) United States Patent
Taquet et al.

(10) Patent No.: US 12,236,651 B2
(45) Date of Patent: Feb. 25, 2025

(54) ANGULAR PRIOR AND DIRECT CODING MODE FOR TREE REPRESENTATION CODING OF A POINT CLOUD

(71) Applicant: BlackBerry Limited, Waterloo (CA)

(72) Inventors: Jonathan Taquet, Talensac (FR); Sébastien Lasserre, Thorigné-Fouillard (FR)

(73) Assignee: BlackBerry Limited, Waterloo (CA)

(*) Notice: Subject to any disclaimer, the term of this patent is extended or adjusted under 35 U.S.C. 154(b) by 305 days.

(21) Appl. No.: 17/771,196

(22) PCT Filed: Oct. 31, 2019

(86) PCT No.: PCT/IB2019/001247
§ 371 (c)(1),
(2) Date: Apr. 22, 2022

(87) PCT Pub. No.: WO2021/084293
PCT Pub. Date: May 6, 2021

(65) Prior Publication Data

US 2022/0366612 A1 Nov. 17, 2022

(51) Int. Cl.
*H04N 19/00* (2014.01)
*G06T 9/40* (2006.01)

(52) U.S. Cl.
CPC ..................................... *G06T 9/40* (2013.01)

(58) Field of Classification Search
CPC .................................. G06T 9/40; H04N 19/96
See application file for complete search history.

(56) References Cited

U.S. PATENT DOCUMENTS

| | | | |
|---|---|---|---|
| 11,361,472 | B2 | 6/2022 | Lasserre et al. |
| 11,871,037 | B2 | 1/2024 | Ramasubramonian et al. |
| 11,895,307 | B2 | 2/2024 | Mammou et al. |
| 11,941,855 | B2 | 3/2024 | Ray et al. |
| 2006/0046751 | A1 | 3/2006 | Le |
| 2011/0282581 | A1 | 11/2011 | Zeng |
| 2016/0086353 | A1 | 3/2016 | Lukac et al. |
| 2017/0214943 | A1 | 7/2017 | Cohen et al. |
| 2017/0347100 | A1 | 11/2017 | Chou et al. |
| 2019/0156520 | A1 | 5/2019 | Mammou et al. |
| 2021/0327095 | A1 | 10/2021 | Van Der Auwera et al. |

(Continued)

FOREIGN PATENT DOCUMENTS

| | | |
|---|---|---|
| CN | 101032172 A | 9/2007 |
| CN | 106846425 A | 6/2017 |

(Continued)

OTHER PUBLICATIONS

Schwarz, Sebastian, et al. "Emerging MPEG standards for point cloud compression." IEEE Journal on Emerging and Selected Topics in Circuits and Systems 9.1 (2018): 133-148.*

(Continued)

*Primary Examiner* — Li Liu
(74) *Attorney, Agent, or Firm* — Moffat & Co

(57) ABSTRACT

A method of encoding or decoding a point cloud for representing a three-dimensional location of an object, the point cloud being generated by a device comprising a plurality of beam emitters. The method comprises using information from the beam emitter such as the location and angle of each beam emitter to more efficiently represent the point cloud data.

20 Claims, 20 Drawing Sheets

(56) References Cited

U.S. PATENT DOCUMENTS

2021/0327098 A1 10/2021 Ray et al.
2021/0327099 A1 10/2021 Van Der Auwera et al.
2021/0407143 A1 12/2021 Van Der Auwera et al.
2021/0409778 A1 12/2021 Ramasubramonian et al.
2022/0337872 A1 10/2022 Park et al.

FOREIGN PATENT DOCUMENTS

CN 108769679 A 11/2018
CN 109196559 A 1/2019
EP 3514969 7/2019
EP 3595180 1/2020
JP 08122132 A 5/1996
WO 2012139192 A2 10/2012

OTHER PUBLICATIONS

Cao, Chao, Marius Preda, and Titus Zaharia. "3D point cloud compression: A survey." Proceedings of the 24th International Conference on 3D Web Technology. 2019.*
Patent Cooperation Treaty, International Search Report for International application No. PCT/IB2019/001247 mailed Jun. 25, 2020.
Lasserre (Blackberry) S et al: "[GPCC][CE 13.22] Report on angular coding mode", 129, MPEG Meeting; Jan. 2020, Brussels, XP030224658.
Lasserre (Blackberry) S et al: "[GPCC][CE 13.22 related] an improvement of the planar coding mode", 128, MPEG Meeting; Oct. 7-11, 2019, Geneva, XP030221087.
"G-PCC Codec description", 126 MPEG Meeting, Mar. 2019, Geneva, XP030222354.
United States Patent and Trademark Office (USPTO): Office Action for U.S. Appl. No. 17/771,246, Dated Sep. 19, 2024, 69 pages.
United States Patent and Trademark Office (USPTO) Office Action for U.S. Appl. No. 17/765,015 mailed Jun. 12, 2024, 22 pages.
United States Patent and Trademark Office (USPTO) Notice of Allowance and Fee(s) Due for U.S. Appl. No. 18/145,908 mailed Aug. 8, 2024, 17 pages.
In-Wook Song et al., "Progressive compression of PointTexture images" Article in Proceedings of SPIE, Visual Communications and Image Processing 2004, Jan. 2004, 4 pages.
Miguel Branco Roque Nazare Ferreira, "Dynamic 3D Point Cloud Compression", Master of Science Thesis from Tecnico Lisboa, Nov. 2017, 110 pages.
Armin Hornung et al. "OctoMap: an efficient probabilistic 3D mapping framework based on octrees", Autonomous Robots, 2013, Preprint, 17 pages.
Chenxi Tu et al. "Real-Time Streaming Point Cloud Compression for 3D LiDAR Sensor Using U-Net", IEEE Access, accepted Aug. 2, 2019, date of publication Aug. 14, 2019, date of current version Aug. 28, 2019, 10 pages.
European Patent Office (EPO), Extended European Search Report (EESR), Application No. 19200890.2, Dated: Mar. 20, 2020, 11 pages.
"G-PCC codec description v4" ISO/IEC JTC 1 S/C 29 W/G 11 coding of moving pictures and audio convenorship: UNI (Italy), Jul. 2019, 62 pages.
United States Patent and Trademark Office (USPTO): Office Action for U.S. Appl. No. 17/798,205, Dated: Mar. 15, 2024.
KR Office Action for Application No. 10-2020-7023062, Dated Jun. 17, 2024, 4 pages.
Joaquim Salvi et al., "Pattern codification strategies in structured light systems", Pattern Recognition, vol. 37, Issue 4, Accepted Oct. 2023 and published Apr. 2004, pp. 827-849.
Cha Zhang et al., "Point cloud attribute compression with graph transform", 2014 IEEE International Conference on Image Processing (ICIP), 2004, pp. 2066-2070.
EP Office Action for Application No. 20707206.7, Dated Jul. 4, 2024.
Sebastien Lasserre et al., An improvement of the planar coding mode (paper), ISO/IEC JTC1/SC29/WG11 MPEG2019/m50642, Oct. 2019, Geneva, CH, 4 pages.
China National Intellectual Property Administration (CNIPA): Office Action for Application No. 201980101940.0, dated Sep. 5, 2024, 5 pages.
Korean Intellectual Property Office (KIPO): Office Action for Application No. 10-2022-7014079, Dated: Oct. 21, 2024, 3 pages.
China National Intellectual Property Administration (CNIPA): Office Action for Application No. 201980101992.8, dated Dec. 12, 2024, 8 pages.

* cited by examiner

ANGULAR PRIOR AND DIRECT CODING MODE FOR TREE REPRESENTATION CODING OF A POINT CLOUD

FIELD

The present application generally relates to point cloud compression and, in particular to methods and devices for improved compression of occupancy data in tree-based coding of point clouds and of point coordinate data.

BACKGROUND

Data compression is used in communications and computer networking to store, transmit, and reproduce information efficiently. There is an increasing interest in representations of three-dimensional objects or spaces, which can involve large datasets and for which efficient and effective compression would be highly useful and valued. In some cases, three-dimensional objects or spaces may be represented using a point cloud, which is a set of points each having a three coordinate location (X, Y, Z) and, in some cases, other attributes like color data (e.g. luminance and chrominance), transparency, reflectance, normal vector, etc. Point clouds can be static (a stationary object or a snapshot of an environment/object at a single point in time) or dynamic (a time-ordered sequence of point clouds).

Example applications for point clouds include topography and mapping applications. Autonomous vehicle and other machine-vision applications may rely on point cloud sensor data in the form of 3D scans of an environment, such as from a LiDAR scanner. Virtual reality simulations may rely on point clouds.

It will be appreciated that point clouds can involve large quantities of data and compressing (encoding and decoding) that data quickly and accurately is of significant interest. Accordingly, it would be advantageous to provide for methods and devices that more efficiently and/or effectively compress data for point clouds. Such methods may result in savings in storage requirements (memory) through improved compression, or savings in bandwidth for transmission of compressed data, thereby resulting in improved operation of 3D vision systems, such as for automotive applications, or improved speed of operation and rendering of virtual reality systems, as examples.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
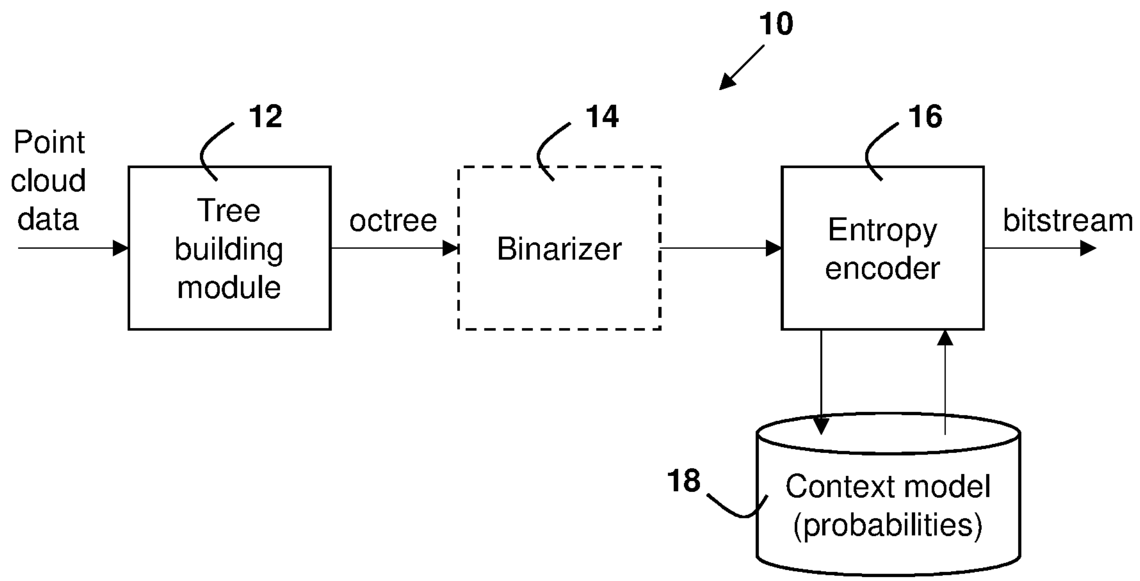
FIG. 1 shows a simplified block diagram of an example point cloud encoder.

The present application describes methods of encoding and decoding point clouds, and encoders and decoders for encoding and decoding point clouds.

In one aspect, there is provided a method of encoding a point cloud to generate a bitstream of compressed point cloud data representing a three-dimensional location of an object, the point cloud being represented by a tree and being generated by a plurality of beam emitters, the method comprising: a) encoding a first coordinate and a second coordinate of a point belonging to a current node of the tree, and computing a radius from the first and second encoded coordinates; b) determining a beam angle of a probing beam emitter, among the plurality of beam emitters, assumed to have acquired the point; c) initializing a range of values to all possible values for a third coordinate of the point; d) selecting a lower value and an upper value within the range of values, the lower value being selected from the lower half of the range and the upper value being selected from the upper half of the range; e) computing a lower angle based on the lower value and the radius, and computing an upper angle based on the upper value and the radius; f) selecting an angular context based on the lower angle, the upper angle and the beam angle; g) entropy coding information representative of the third coordinate of the point based on the angular context to generate the bitstream of compressed point cloud data.

In another aspect, there is provided a method of decoding a bitstream of compressed point cloud data representing a three-dimensional location of an object, for generating a point cloud data, the compressed point cloud being represented by a tree and being generated by a device comprising a plurality of beam emitters, the method comprising: a) decoding a first coordinate and a second coordinate of a point belonging to a current node of the tree, and computing a radius from the first and second decoded coordinates b) determining a beam angle of a probing beam emitter, among the plurality of beam emitters, assumed to have acquired the point; c) initializing a range of values to all possible values for a third coordinate of the point within a volume associated with the current node; d) selecting a lower value and an upper value within the range of values, the lower value being selected from the lower half of the range and the upper value being selected from the upper half of the range; e) computing a lower angle based on the lower value and the radius, and computing an upper angle based on the upper value and the radius; f) selecting an angular context based on the lower angle, the upper angle and the beam angle; g) decoding information, from the bitstream, representative of the third coordinate based on the angular context.

In yet another aspect, there is provided an encoder for encoding a point cloud to generate a bitstream of compressed point cloud data, representing a three-dimensional location of a physical object, the point cloud being generated by a device comprising a plurality of beam emitters, the encoder comprising: a processor; a memory; and an encoding application containing instructions executable by the processor that, when executed, cause the processor to a) encode a first coordinate and a second coordinate of a point belonging to a current node of the tree, and computing a radius from the first and second encoded coordinates; b) determine a beam angle of a probing beam emitter, among the plurality of beam emitters, assumed to have acquired the point; c) initializing a range of values to all possible values for a third coordinate of the point; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) entropy code information representative of the third coordinate of the point based on the angular context to generate the bitstream of compressed point cloud data.

In yet another aspect, there is provided decoder for decoding a bitstream of compressed point cloud data to produce a reconstructed point cloud representing a three-dimensional location of a physical object, the point cloud being generated by a device comprising a plurality of beam emitters, the decoder comprising: a processor; a memory; and a decoding application containing instructions executable by the processor that, when executed, cause the processor to a) decode a first coordinate and a second coordinate of a point belonging to a current node of the tree, and computing a radius from the first and second decoded coordinates b) determine a beam angle of a probing beam emitter, among the plurality of beam emitters, assumed to have acquired the point; c) initialize a range of values to all possible values for a third coordinate of the point within a volume associated with the current node; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) decode information, from the bitstream, representative of the third coordinate based on the angular context.

In yet another aspect, there is provided a non-transitory processor-readable medium storing processor-executable instructions that, when executed by a processor, cause the processor to a) encode a first coordinate and a second coordinate of a point belonging to a current node of the tree, and computing a radius from the first and second encoded coordinates; b) determine a beam angle of a probing beam emitter, among the plurality of beam emitters, assumed to have acquired the point; c) initializing a range of values to all possible values for a third coordinate of the point; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) entropy code information representative of the third coordinate of the point based on the angular context to generate the bitstream of compressed point cloud data.

In yet another aspect, there is provided a non-transitory processor-readable medium storing processor-executable instructions that, when executed by a processor, cause the processor to a) decode a first coordinate and a second coordinate of a point belonging to a current node of the tree, and computing a radius from the first and second decoded coordinates b) determine a beam angle of a probing beam emitter, among the plurality of beam emitters, assumed to have acquired the point; c) initialize a range of values to all possible values for a third coordinate of the point within a volume associated with the current node; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) decode information, from the bitstream, representative of the third coordinate based on the angular context.

In yet another aspect, there is provided a computer-readable signal containing program instructions which, when executed by a computer, cause the computer to a) encode a first coordinate and a second coordinate of a point belonging to a current node of the tree, and computing a radius from the first and second encoded coordinates; b) determine a beam angle of a probing beam emitter, among the plurality of beam emitters, assumed to have acquired the point; c) initializing a range of values to all possible values for a third coordinate of the point; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) entropy code information representative of the third coordinate of the point based on the angular context to generate the bitstream of compressed point cloud data.

In yet another aspect, there is provided a computer-readable signal containing program instructions which, when executed by a computer, cause the computer to a) decode a first coordinate and a second coordinate of a point belonging to a current node of the tree, and computing a radius from the first and second decoded coordinates b) determine a beam angle of a probing beam emitter, among the plurality of beam emitters, assumed to have acquired the point; c) initialize a range of values to all possible values for a third coordinate of the point within a volume associated with the current node; d) select a lower value and an upper value within the range of values, the lower value being selected from the lower half of the range and the upper value being selected from the upper half of the range; e) compute a lower angle based on the lower value and the radius, and computing an upper angle based on the upper value and the radius; f) select an angular context based on the lower angle, the upper angle and the beam angle; g) decode information, from the bitstream, representative of the third coordinate based on the angular context.

Other aspects and features of the present application will be understood by those of ordinary skill in the art from a review of the following description of examples in conjunction with the accompanying figures.

Any feature described in relation to one aspect or embodiment of the invention may also be used in respect of one or more other aspects/embodiments. These and other aspects of the present invention will be apparent from, and elucidated with reference to, the embodiments described herein.

At times in the description below, the terms "node", "volume" and "sub-volume" may be used interchangeably. It will be appreciated that a node is associated with a volume or sub-volume. The node is a particular point on the tree that may be an internal node or a leaf node. The volume or sub-volume is the bounded physical space that the node represents. The term "volume" may, in some cases, be used to refer to the largest bounded space defined for containing the point cloud. A volume may be recursively divided into sub-volumes for the purpose of building out a tree-structure of interconnected nodes for coding the point cloud data. The tree-like structure of partitioning of volumes into sub-volumes may be referred to as a "parent" and "child" relationship, where the sub-volumes are child nodes or child sub-volumes to the parent node or parent volume. Sub-volumes within the same volume may be referred to as sibling nodes or sibling sub-volumes.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

A point cloud is a set of points in a three-dimensional coordinate system. The points are often intended to represent the external surface of one or more objects. Each point has a location (position) in the three-dimensional coordinate system. The position may be represented by three coordinates (X, Y, Z), which can be Cartesian or any other coordinate system. The points may have other associated attributes, such as color, which may also be a three components value in some cases, such as R, G, B or Y, Cb, Cr. Other associated attributes may include transparency, reflectance, a normal vector, etc., depending on the desired application for the point cloud data.

Point clouds can be static or dynamic. For example, a detailed scan or mapping of an object or topography may be static point cloud data. The LiDAR-based scanning of an environment for machine-vision purposes may be dynamic in that the point cloud (at least potentially) changes over time, e.g. with each successive scan of a volume. The dynamic point cloud is therefore a time-ordered sequence of point clouds.

Point cloud data may be used in a number of applications, including conservation (scanning of historical or cultural objects), mapping, machine vision (such as autonomous or semi-autonomous cars), and virtual reality systems, to give some examples. Dynamic point cloud data for applications like machine vision can be quite different from static point cloud data like that for conservation purposes. Automotive vision, for example, typically involves relatively small resolution, non-colored, highly dynamic point clouds obtained through LiDAR (or similar) sensors with a high frequency of capture. The objective of such point clouds is not for human consumption or viewing but rather for machine object detection/classification in a decision process. As an example, typical LiDAR frames contain on the order of tens of thousands of points, whereas high quality virtual reality applications require several millions of points. It may be expected that there will be a demand for higher resolution data over time as computational speed increases and new applications are found.

While point cloud data is useful, a lack of effective and efficient compression, i.e. encoding and decoding processes, may hamper adoption and deployment. A particular challenge in coding point clouds that does not arise in the case of other data compression, like audio or video, is the coding of the geometry of the point cloud. Point clouds tend to be sparsely populated, which makes efficiently coding the location of the points that much more challenging.

Tree-Based Structures

One of the more common mechanisms for coding point cloud data is through using tree-based structures. In a tree-based structure, the bounding three-dimensional volume for the point cloud is recursively divided into sub-volumes. Nodes of the tree correspond to sub-volumes. The decision of whether or not to further divide a sub-volume may be based on resolution of the tree and/or whether there are any points contained in the sub-volume. A node may have an occupancy flag that indicates whether its associated sub-volume contains a point or not. Splitting flags may signal whether a node has child nodes (i.e. whether a current volume has been further split into sub-volumes). These flags may be entropy coded in some cases and in some cases predictive coding may be used.

The three-dimensional volume for the point cloud can also be define by using a bounding box. A quad-tree plus binary-tree (QTBT) structure for the bounding box allow to partition the point-cloud in non-cubic volumes which may better represent the overall shape of the point cloud or objects within the point-cloud. A quad-tree (QT) partitioning splits a volume into four sub-volumes, for example by splitting the volume using two planes cutting the volume into four parts. A binary tree (BT) partitioning splits a volume into two sub-volumes, for example by splitting the volume using one plane cutting the volume into two parts.

A commonly-used tree structure is an octree. In this structure, the volumes/sub-volumes are all cubes (or more generally cuboids) and each split of a sub-volume results in eight further sub-volumes/sub-cubes. Another commonly-used tree structure is a KD-tree, in which a volume (cube or rectangular cuboid) is recursively divided in two by a plane orthogonal to one of the axes. Octrees are a special case of KD-trees, where the volume is divided by three planes, each being orthogonal to one of the three axes. A KD-tree may typically be obtained by applying recursively a Binary Tree (BT) partitioning.

The partitioning of a volume is not necessarily into two sub-volumes (KD-tree) or eight sub-volumes (octree), but could involve other partitions, including division into non-cuboid shapes or involving non-adjacent sub-volumes.

The present application may refer to octrees for ease of explanation and because they are a popular candidate tree structure for automotive applications, but it will be understood that the methods and devices described herein may be implemented using other tree structures.

Reference is now made to FIG. 1, which shows a simplified block diagram of a point cloud encoder 10 in accordance with aspects of the present application. The point cloud encoder 10 includes a tree building module 12 for receiving point cloud data and producing a tree (in this example, an octree) representing the geometry of the volumetric space containing the point cloud and indicating the location or position of points from the point cloud in that geometry.

In the case of a uniformly partitioned tree structure, like an octree, each node may be represented by a sequence of occupancy bits, where each occupancy bit corresponds to one of the sub-volumes in the node and signals whether than sub-volume contains at least one point or not. Occupied sub-volumes are recursively split up to a maximum depth of the tree. This may be termed the serialization or binarization of the tree. As shown in FIG. 1, in this example, the point cloud encoder 10 includes a binarizer 14 for binarizing the octree to produce a bitstream of binarized data representing the tree.

This sequence of bits may then be encoded using an entropy encoder 16 to produce a compressed bitstream. The entropy encoder 16 may encode the sequence of bits using a context model 18 that specifies probabilities for coding bits based on a context determination by the entropy encoder 16. The context model 18 may be adaptively updated after coding of each bit or defined set of bits. The entropy encoder 16 may, in some cases, be a binary arithmetic encoder. The binary arithmetic encoder may, in some implementations, employ context-adaptive binary arithmetic coding (CABAC). In some implementations, coders other than arithmetic coders may be used.

In some cases, the entropy encoder 16 may not be a binary coder, but instead may operate on non-binary data. The output octree data from the tree building module 12 may not be evaluated in binary form but instead may be encoded as non-binary data. For example, in the case of an octree, the eight flags within a sub-volume (e.g. occupancy flags) in their scan order may be considered a $2^8$-1 bit number (e.g. an integer having a value between 1 and 255 since the value 0 is not possible for a split sub-volume, i.e. it would not have been split if it was entirely unoccupied). This number may be encoded by the entropy encoder using a multi-symbol arithmetic coder in some implementations. Within a sub-volume, e.g. a cube, the sequence of flags that defines this integer may be termed a “pattern”.

A convention that is typically used in point cloud compression is that an occupancy bit value of 1 signals that the associated node or volume is “occupied”, i.e. that it contains at least one point, and an occupancy bit value of 0 signals that the associated node or volume is “unoccupied”, i.e. that it contains no points. More generally, an occupancy bit may have a value indicating occupied or a value indicating unoccupied. In the description below for ease of explanation, example embodiments may be described in which the convention of 1=occupied and 0=unoccupied is used; however it will be understood that the present application is not limited to this convention.

Figure 2:
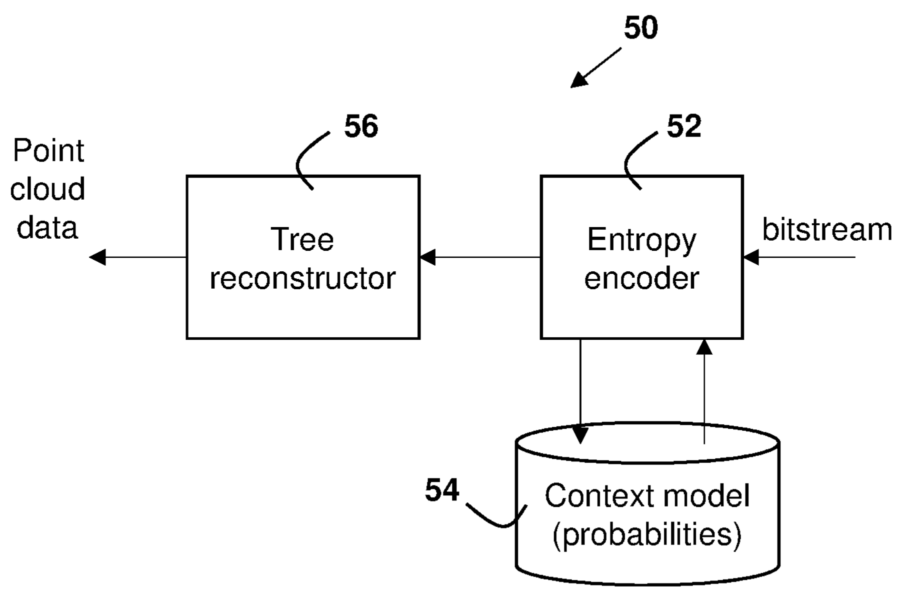
FIG. 2 shows a simplified block diagram of an example point cloud decoder.

A block diagram of an example point cloud decoder 50 that corresponds to the encoder 10 is shown in FIG. 2. The point cloud decoder 50 includes an entropy decoder 52 using the same context model 54 used by the encoder 10. The entropy decoder 52 receives the input bitstream of compressed data and entropy decodes the data to produce an output sequence of decompressed bits. The sequence is then converted into reconstructed point cloud data by a tree reconstructor 56. The tree reconstructor 56 rebuilds the tree structure from the decompressed data and knowledge of the scanning order in which the tree data was binarized. The tree reconstructor 56 is thus able to reconstruct the location of the points from the point cloud (subject to the resolution of the tree coding).

In European patent application no. 18305037.6, the present applicants described methods and devices for selecting among available pattern distributions to be used in coding a particular node's pattern of occupancy based on some occupancy information from previously-coded nodes near the particular node. In one example implementation, the occupancy information is obtained from the pattern of occupancy of the parent to the particular node. In another example implementation, the occupancy information is obtained from one or more nodes neighboring the particular node. The contents of European patent application no. 18305037.6 are incorporated herein by reference. This is referred to as determining a “neighbor configuration” and selecting a context (i.e. a pattern distribution) at least partly based on the neighbor configuration.

In European patent application no. 18305415.4, the present applicants described methods and devices for binary entropy coding occupancy patterns. The contents of European patent application no. 18305415.4 are incorporated herein by reference.

Inferred Direct Coding Mode (IDCM)

One of the problems with compressing point cloud data in a tree-structure is that it does not necessarily deal with isolated points very well. The recursive splitting of the sub-volume and the location of points within the split sub-volumes involves computational burden and time, and the signaling of recursive splitting of sub-volumes to pinpoint the location of one or a few isolated points can be costly in terms of bandwidths/memory storage, as well as computational time and resources. Furthermore, isolated points “pollute” the distribution of patterns, inducing many patterns with only one occupied child, thus changing the balance of the distribution and penalizing the coding of other patterns.

Therefore, the direct coding of positional information for isolated points has been proposed. The direct coding of a point's position, e.g. coordinates within a volume or sub-volume, may be termed Direct Coding Mode (DCM). As it would be highly inefficient to use DCM for all points, one option is to signal, for each occupied node, using a dedicated flag, whether DCM will be used for any points within that node; however, this option may result in excessive overhead cost in signaling, thereby producing worse compression performance.

Another option is to determine the eligibility to use DCM for an occupied node based on occupancy information from other nodes. If the occupied node is eligible to use DCM, then a flag is inserted in the bitstream to signal whether DCM is applied or not. This approach may be termed Inferred Direct Coding Mode (IDCM).

The eligibility conditions for IDCM for a tree whose volumes are made of adjacent cuboids may be: A) none of the six neighboring cuboids (top, bottom, forward, back, left, right) are occupied; or in the case where the neighboring cuboids' occupancy is unknown, B) the number of occupied nodes in the parent pattern is equal to one, ie. the current node is isolated at the parent level. In some cases it may be beneficial to apply either conditions A) and B) with condition C) the number of occupied nodes in the grand-parent pattern is equal to one, ie. the current node is also isolated at the grand-parent level. Furthermore, the threshold for the number of occupied parent or grand-parent nodes may be other than one.

If a node is eligible for DCM, then a flag is coded to signal whether DCM is applied or not. This flag may be determined by an encoder based upon the number of points belonging to the volume attached to the node. If this number is less than or equal to a threshold, DCM is activated, and otherwise it is not.

Therefore, in accordance with another aspect of the present application, the eligibility to use DCM for an occupied node is determined based on occupancy information from other nodes. If the occupied node is eligible to use DCM, then a flag is inserted in the bitstream to signal whether DCM is applied or not.

When DCM is applied, the coding of points may be performed by coding the number of points using a truncated unary binarizer followed by a binary entropy coder, but other binarizations may be used depending on the threshold selected for eligibility, and by coding the X, Y, and Z coordinates of each point independently, relative to the volume associated with the node. For example, if a cube has sides of size $2^D$, then D bits will be needed for each coordinate of each point.

The value of the threshold should be known by the decoder, either implicitly or as a coded parameter.

Planar Mode

Certain types of point cloud data tend to have strong directionality. Non-natural environments in particular exhibit strong directionality as those environments tend to feature uniform surfaces. For example, in the case of LiDAR the roadway and the walls of adjacent buildings are generally horizontally or vertically planar. In the case of interior scans within rooms, the floor, ceiling and walls are all planar. LiDAR for the purpose of automotive vision and similar applications tends to be lower resolution and also needs to be compressed quickly and efficiently.

Octrees are efficient tree structures because they are based around a uniform partitioning process of equal division of a cube into eight sub-cubes using three orthogonal planes in every case, so signaling their structure is efficient. However, octrees using current signaling processes are not able to exploit the efficiencies available from recognizing the planar nature of some non-natural environments. KD-trees, however, are able to better tailor the partitioning to the directionality of the point cloud. This makes them a more efficient and effective structure for these types of environments. The downside to KD-trees is that the signaling of their structure requires significantly more data than octrees. The fact that KD-trees are non-uniform means that some of the techniques used to improve octree compression are unavailable to KD-trees or would be computationally difficult to implement.

Accordingly, it is advantageous to have a mechanism for representing non-natural environments using a uniform partitioning-based tree structure in a manner that improves compression by exploiting horizontal and/or vertical directionality.

In some cases, point cloud compression can be improved by a planar coding mode. The planar mode is used to indicate that a volume meets certain requirements for planarity in terms of its occupancy. In particular, a volume is planar if all of its occupied sub-volumes are positioned or located in a common plane. The syntax for signaling may indicate whether a volume is planar and, if so, the position of the common plane. Through exploiting this knowledge of planarity, gains in compression may be achieved. Applying criteria for eligibility to enable the planar mode and mechanisms for context-adaptive coding of the planar mode signaling help improve compression performance.

Planarity is generally presumed to be with respect to a Cartesian axis aligned with the structure of the volumes and sub-volumes. That is a volume is planar if all its occupied sub-volumes are positioned in a common plane orthogonal to one of the axes. As a convention, the z-axis is vertical, meaning that the (horizontal) plane is orthogonal to the z-axis.

For an eligible node, a flag, referred to herein as isPlanar, may be added to signal whether the node is planar. The flag may be entropy coded using prediction techniques. In view of generalizing to x-planar and y-planar modes, the syntax may be composed of 3 flags: isZPlanar, isXPlanar, and isYplanar.

Figure 3:
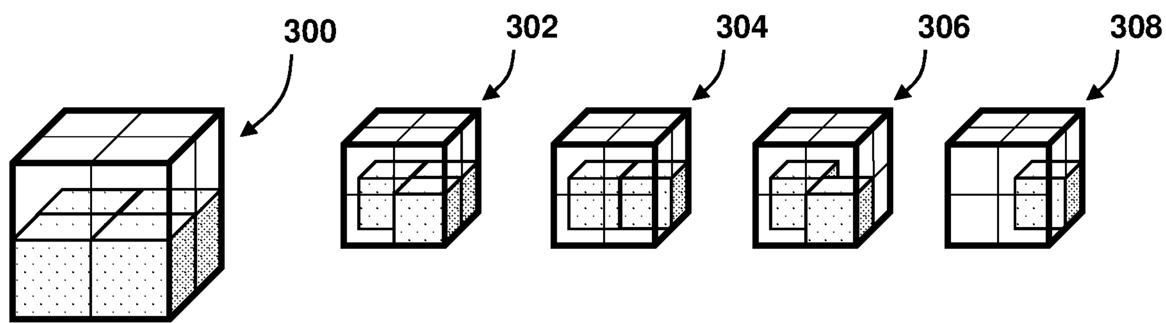
FIGS. 3 and 4 illustrate examples of a volume exhibiting planarity in its occupied child sub-volumes.
Figure 4:
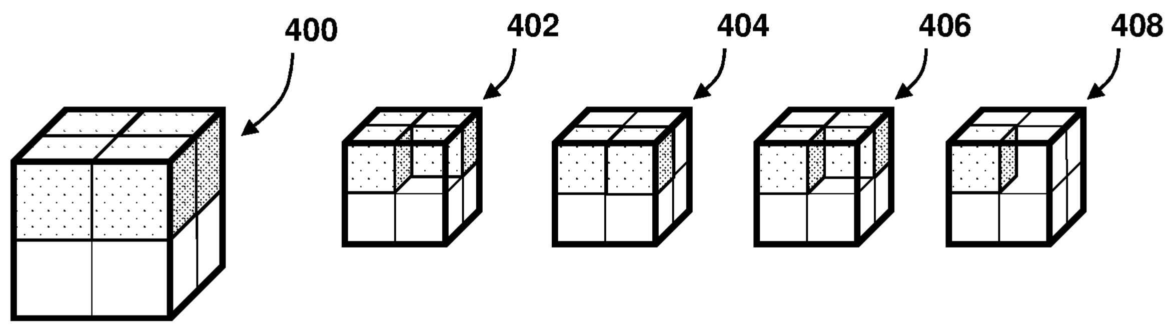

In some embodiments, a node is said to be planar if all its occupied child nodes belong to the same horizontal plane. In the case of octrees, such a plane consists of four child nodes, one of which is necessarily occupied. As shown in FIGS. 3 and 4, the horizontal plane can be located at the bottom of the current node, corresponding to a first value of a flag planePosition, e.g. 0, as shown by block 300, or at the top of the current node, corresponding to a second value of planePosition, e.g. 1, as shown by block 400.

Therefore, if the current node is planar, an extra bit planePosition is added to the syntax to indicate the plane position. This bit is also entropy coded.

The knowledge of the planar status of the current node helps coding the occupancy pattern. For example, if the node is z-planar, the four occupancy bits associated with the child nodes belonging to the empty horizontal plane need not be coded. Similarly, if the current node is not planar, it can be assumed that there is at least one occupied child per horizontal plane, and this knowledge can be used to better compress the bitstream.

Various occupancy examples for the case where the planePosition is the bottom is shown in FIG. 3 as blocks 302, 304, 306, and 308. Similarly, various occupancy examples for the case where the planePosition is the top is shown in FIG. 4 as blocks 402, 404, 406, and 408.

Figure 5:
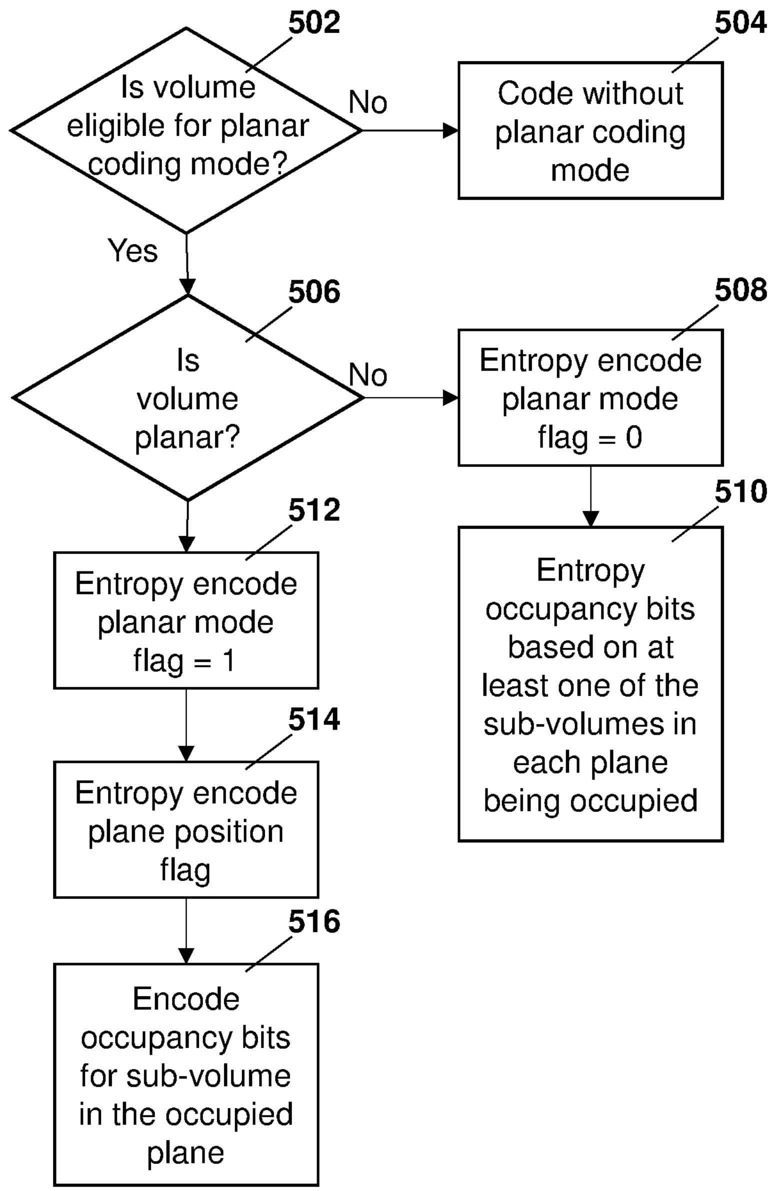
FIG. 5 shows, in flowchart form, one example method of encoding point cloud data using a planar coding mode.

A method for encoding a node in planar mode is shown with respect to FIG. 5. The method of FIG. 5 reflects the process for encoding occupancy information for a volume. In this example, the volume is uniformly partitioned into eight sub-volumes, each having an occupancy bit, in accordance with octree-based coding. For simplicity, the present example assumes only one (e.g. horizontal) planar mode is used.

In operation 502, the encoder assesses whether the volume is eligible for planar coding mode. Eligibility may be based on cloud density in one example, which may be assessed using mean number of occupied child nodes. To improve local adaptation, eligibility may be based on probability factor tracking. If planar coding mode is not eligible, then the occupancy pattern for the volume is encoded without using planar coding mode, as indicted by operation 504.

If planar mode is enabled, then in operation 506, the encoder assesses whether the volume is planar. If not, then in operation 508 it encodes the planar mode flag, e.g. isPlanar=0. In operation 510, the encoder then encodes the occupancy pattern based on there being at least one occupied sub-volume per plane. That is, the occupancy pattern is encoded and if the first three bits coded for either plane (upper or lower) are zero then the last (fourth) bit for that plane is not coded and is inferred to be one since the corresponding sub-volume must be occupied.

If planar mode is enabled and the volume is planar, then in operation 512 the planar mode flag is encoded, e.g. isPlanar=1. Because the volume is planar, the encoder then also encodes the plane position flag, planePosition. The plane position flag signals whether the planar occupied sub-volumes are in the upper half or lower half of the volume. For example, planePosition=0 may correspond to the lower half (i.e. lower z-axis position) and planePosition=1 may correspond to the upper half. The plane position flag is then encoded at operation 514. The occupancy bits are then encoded based on knowledge of the planarity of the volume and the position of the occupied sub-volumes at operation 516. That is, up to four bits are encoded since four may be inferred to be zero, and the fourth bit may be inferred to be one if the first three encoded are zero.

LiDAR Acquired Point Clouds

Typically, LiDAR-acquired point clouds are acquired by a set of spinning lasers. An exemplary LiDAR device is shown with respect to FIG. 6.

Figure 6:
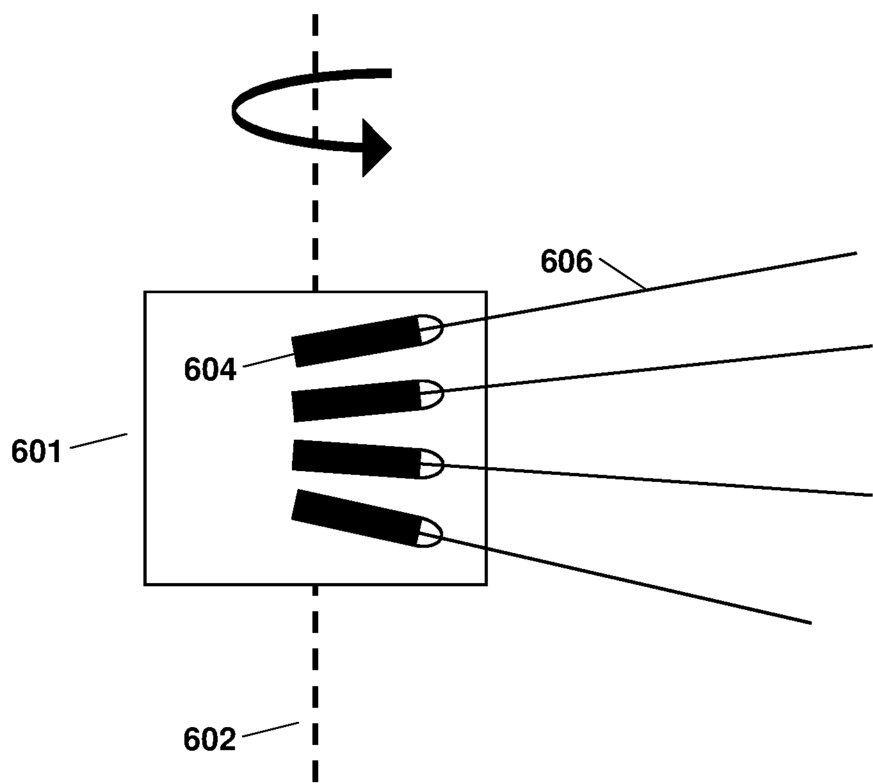
FIG. 6 shows a simplified illustration of an example of a beam assembly for acquiring point clouds.

As seen in FIG. 6, the LiDAR device 601 comprises a vertically arranged array of lasers 604 mounted on a spinning head, such that each laser rotates around the head axis 602. Each laser emits a laser beam 606.

Figure 7:
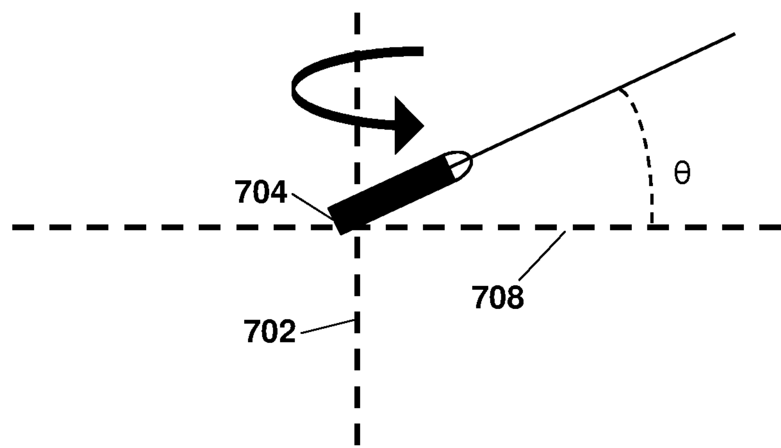
FIG. 7 shows a simplified illustration of an example of a single beam emitter in the beam assembly.

Reference is now made to FIG. 7, which illustrates a single laser 704 rotating around a head axis 702 and having an angle θ with respect to the plane 708. The plane 708 is perpendicular to the head axis 702. Naturally, points acquired by the laser will have an angle of acquisition which will be very close to θ, due to noise and measurement precision.

Figure 8:
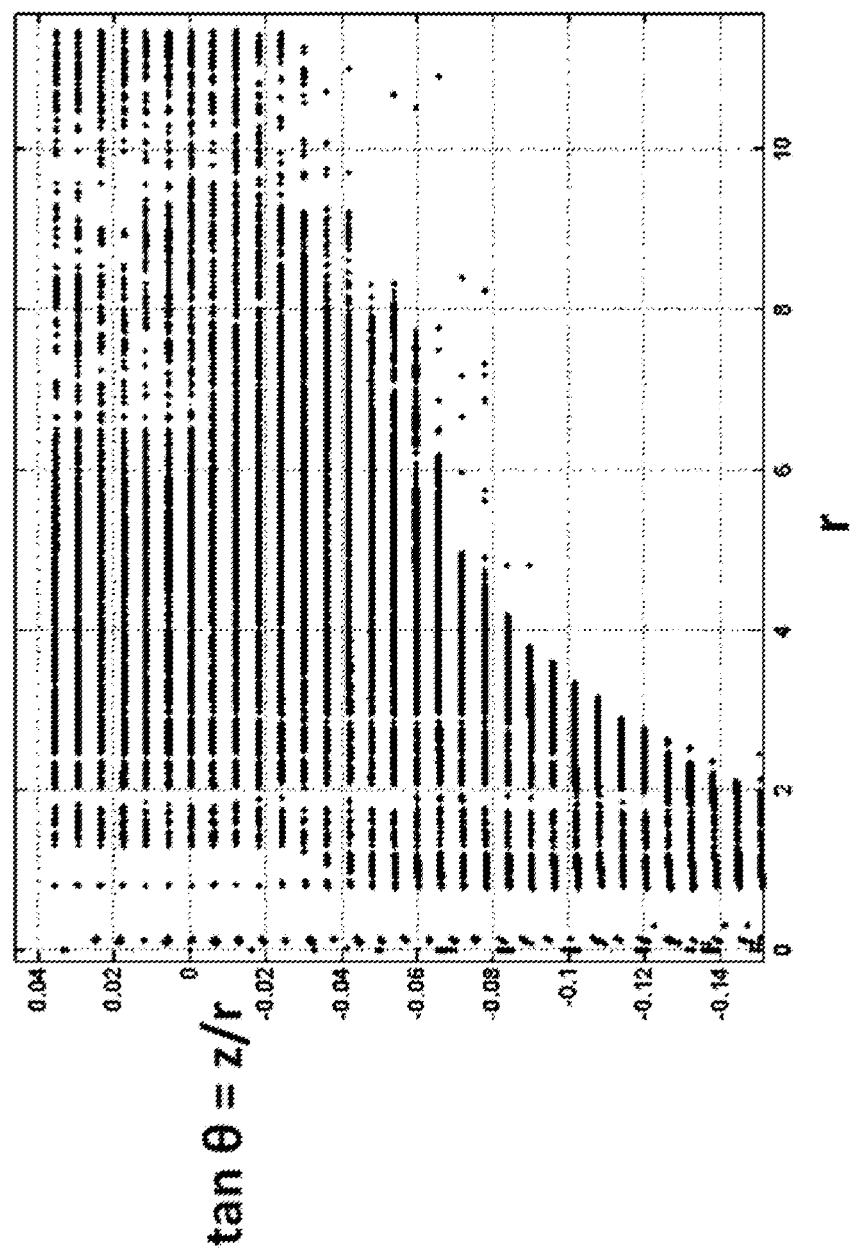
FIG. 8 shows a diagram including points of an example point cloud expressed in the (r, θ) plane.
Figure 9:
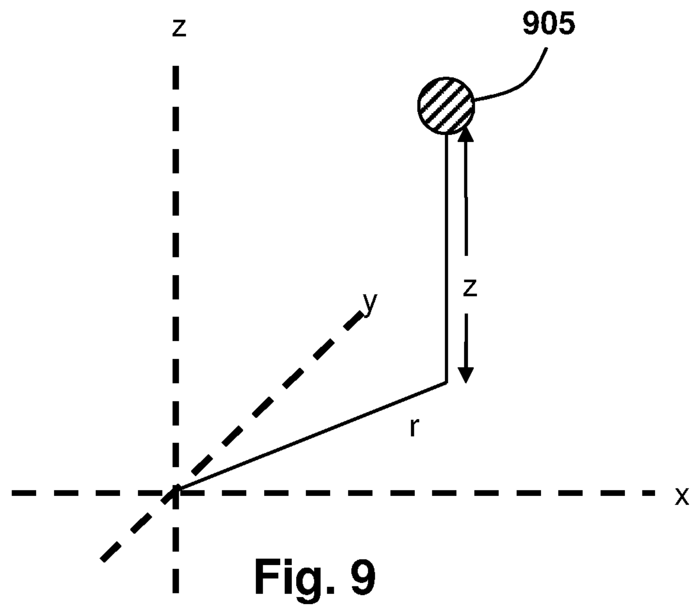
FIG. 9 shows an example assignment of coordinate axes relative to a point of the point cloud.

FIG. 8 illustrates points of a LiDAR-acquired point cloud on a diagram where the vertical axis represents tan(θ), or z/r, and the horizontal axis represents r. By definition and as shown in FIG. 9, r is the horizontal distance of a point from the LiDAR's head (or beam assembly in general), and the tangent of the vertical angle tan(θ) is defined as the ratio z/r where z is the vertical elevation of the point 905 relative to the LiDAR's head.

Somewhat fixed laser angles tan(θ) can be clearly observed in the diagram. Positive angles signify that the lasers are pointed above the horizontal plane (i.e., towards the sky), while negative angles signify that the lasers are pointed below the horizontal plane (i.e., to the ground). Notably, lasers of the LiDAR are deliberately oriented at different angles—e.g., so that different lasers pick up different parts of the same tall object, like buildings, poles, trees, etc.

As can be seen from FIG. 8, the points of the point cloud can be represented in a "quasi" 2D space. For example, a representation is theoretically possible in the 2D space (x,y) and a finite set of vertical angles θ corresponding to the laser beams. Or equivalently in the 2D polar space (φ, r), where φ is the azimuthal angle, and the finite set of vertical angles θ. In other words, one may represent the points in spherical coordinates (φ, r, θ) where θ can take only a finite number of values. This is a consequence of occlusions, which lead to only at most one point per (φ, θ). This quasi 2D space is theoretical but, practically, measurement noise/precision and time integration does not lead to a strictly finite set of possible θ, which is a consequence of the mechanical mounting of the lasers. Instead, it is observed that the values of θ are spread around a finite number of values $\theta_{laser}$ and one must deal with the issue of "noise" around these values.

The aforementioned quasi-2D structure depends mainly on the position/orientation of one or more LiDARs (or beam assemblies in general) and the intrinsic characteristics of the LiDAR(s). As will be described in more detail below, it can be thus advantageous to include syntax elements (e.g., parameters, flags) into the bitstream that described characteristics of the LiDAR(s) (or beam assembly/assemblies in general). These syntax elements may indicate at least one of a reference location of the beam assembly, origin locations of specific beams, or beam angles of specific beams. Including these syntax elements into the bitstream can be done at a frame or sequence level. In any case, this data should be present as close as possible to the compressed data bitstream to ensure decodability of the bitstream and minimize the risk of losing data needed for decodability.

Taking note of the above, some embodiments of the application seek to use knowledge obtained from LiDAR characteristics (or characteristics of the relevant beam assemblies), of vertical laser angles $\theta_{laser}$ in an efficient representation of the point cloud such that the compression is improved.

Corrected Elevation Angles

Let $(x_{Lidar}, y_{Lidar}, z_{Lidar})$ be the location of a LiDAR's head (or beam assembly in general), oriented vertically along the z axis in the three-dimensional space XYZ (volumetric space) to which the points of the point cloud belong. The tangent tan(θ) of the vertical angle θ of a point (x,y,z) is the ratio of the elevation $z-z_{Lidar}$ and the distance r of the point relatively to the head. This is shown, for example, in Equation 1.

$$\tan\theta=(z-z_{Lidar})/\sqrt{(x-x_{\mathrm{Lidar}})^2+(y-y_{\mathrm{Lidar}})^2} \quad (1)$$

Figure 11:
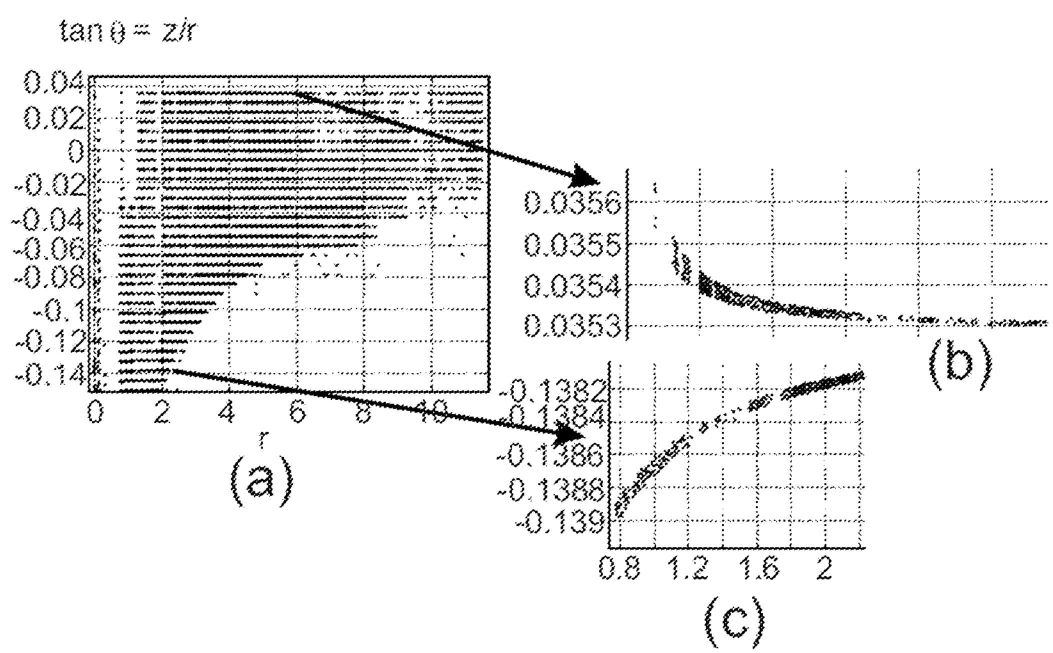
FIG. 11 shows details of the diagram in FIG. 8.

As can be seen from the diagram of FIG. 11, which shows detailed views relative to FIG. 8, the angle tan(θ) is somewhat constant, but not strictly constant, for the points probed by the same beam. In fact, there exists for each beam a respective envelope in the (r, tan(θ)) diagram that contains the points acquired by this beam. The width of this envelope (in the tan(θ) direction) clearly depends on the distance r. The width of this envelope is due to noise and acquisition precision, and widens for lower r. Notably, the envelopes for adjacent beams do not intersect with each other.

A corrected angle $\theta_{corr}$ that exhibits a more stable value through a wide range of r can be obtained by adding a correction term to the position of each laser relative to the head position.

Figure 10:
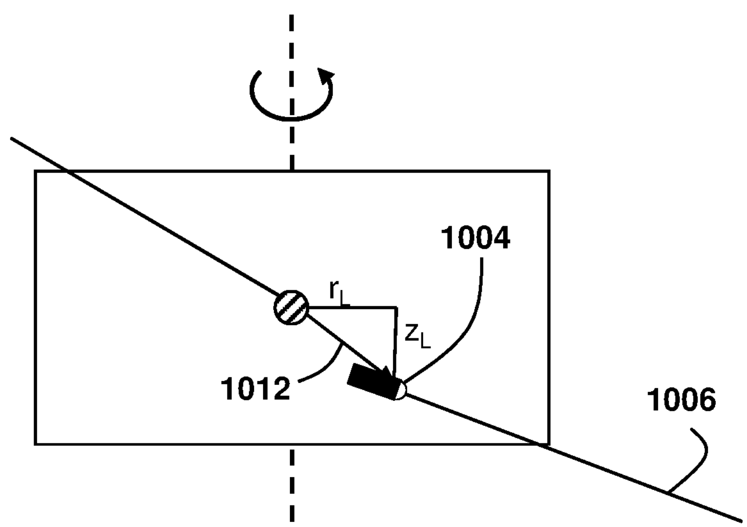
FIG. 10 shows an example of an arrangement of a beam emitter of the beam assembly relative to a reference location of the beam assembly.

FIG. 10 schematically illustrates a location of a beam emitter 1004 relative to the reference location of the beam assembly, for explaining an example method of correcting the angle θ to obtain a corrected angle $\theta_{corr}$. In particular, the position of a beam emitter 1004 is corrected by a shift 1012 defined by coordinates ($r_L$, $z_L$) relative to the reference position of the beam assembly such that the beam 1006 is emitted from the vertical location $z_{Lidar}+z_L$ and the distance of a point to the beam emitter 1004 is corrected to become $r-r_L$, where L is the beam emitter index. As such, the corrected location of the beam emitter 1004 may be referred to as an origin location or beam origin location for the beam 1006. The corrected angle $\theta_{corr}$ depends on the beam emitter index L and is provided by equation 2 below.

$$\tan\theta_{corr,L}=(z-z_{Lidar}-z_L)/(\sqrt{(x-x_{\mathrm{Lidar}})^2+(y-y_{\mathrm{Lidar}})^2}-r_L) \quad (2)$$

For points not too close to the beam assembly, i.e. for not too small values of the distance r, this angle can be approximated as shown in equation 3.

$$\tan\theta_{corr,L}\approx(z-z_{Lidar}-z_L)/\sqrt{(x-x_{\mathrm{Lidar}})^2+(y-y_{\mathrm{Lidar}})^2}=\tan\theta-z_L/r \quad (3)$$

Only the vertical correction $z_L$ is needed while the radial correction $r_L$ may be neglected. As such, the beam origin position may be determined, starting from the reference location of the beam assembly, based on a relative displacement that can be expressed in terms of ($r_L$, $z_L$) or only in terms of $z_L$.

Figure 12:
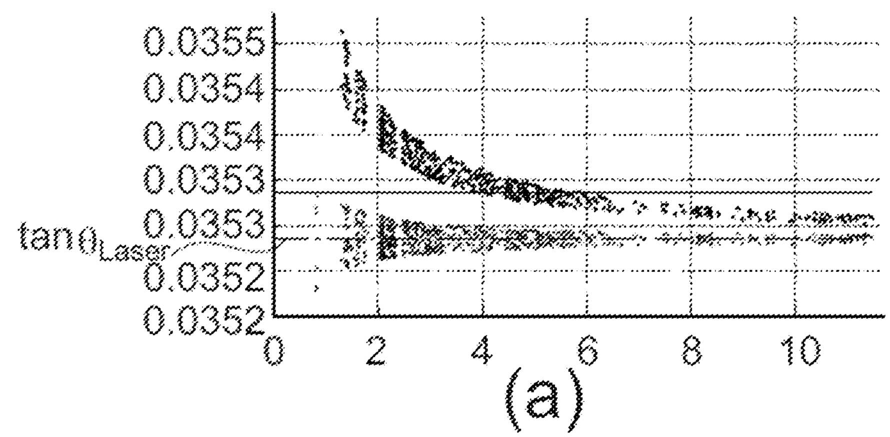
FIG. 12 shows a diagram including points of an example point cloud expressed in the (r, θ) plane after a correction of angle θ has been performed based on characteristics of the beam assembly.
Figure 12:
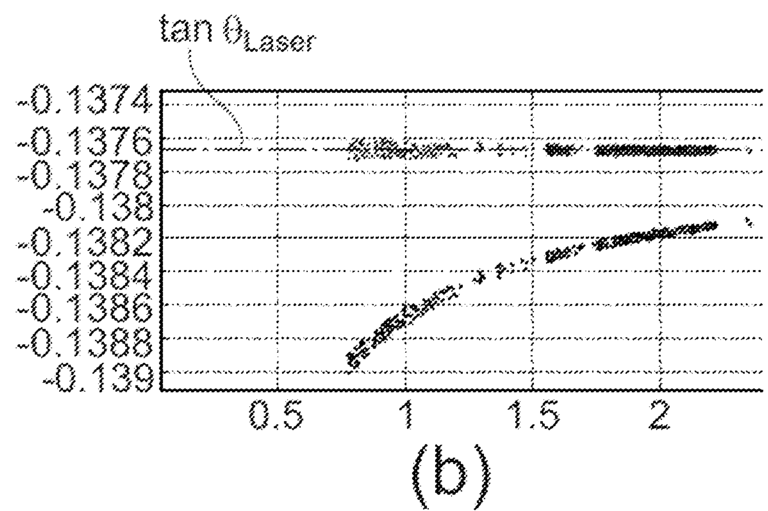

FIG. 12 shows the effect of the vertical correction $z_L$ on the angle θ. Panel (a) corresponds to panel (b) in FIG. 11 and panel (b) corresponds to panel (c) in FIG. 11. The upper envelope in panel (a) and the lower envelope in panel (b) relate to uncorrected (i.e., initial) angles θ. The lower envelope in panel (a) and the upper envelope in panel (b) relate to corrected angles $\theta_{corr}$. As can be clearly seen, the corrected angles exhibit a mean constant behavior substantially independent on the distance r. The angle $\theta_L$ of the respective beam or beam emitter L is defined as this constant.

To enable a correction of angles θ both at the encoder side and the decoder side, the following values may be determined by or provided to the encoder, and encoded into the bitstream such that the decoding process can use the same beam assembly information as the encoding process:

1. the reference location of the beam assembly, such as the LiDAR's head position ($x_{Lidar}$, $y_{Lidar}$, $z_{Lidar}$), for example
2. the relative position ($r_L$ $z_L$) for each beam emitter
3. the constant angle $\theta_L$ for each beam emitter Examples of syntax elements describing characteristics of the beam assembly or beam assemblies that have been used for acquiring point clouds that are to be coded will be described in more details below.

As an example, the reference location of the beam assembly may be provided by a user, and the relative positions and corrected angles of the beam emitters of the beam assembly may be found algorithmically. In one example, this may be performed as follows:

1. First, by analyzing the histogram of non-corrected angles θ, points belonging to a same laser beam L are extracted.
2. Then, the relative position ($r_L$ $z_L$) of the laser beam L is determined by minimizing the standard deviation of the corrected angles $\theta_{corr,L}$ over the extracted points. This can be performed by a classical minimization algorithm, for example. In case only the vertical shift $z_L$ is considered, this is a simple minimization on an interval of candidate vertical relative positions.
3. Finally, the constant angle $\theta_L$ of the laser L is the mean value of the corrected angles $\theta_{corr,L}$ over the extracted points.

As will be appreciated, if a node corresponds to a volume which can be intersected by more than one laser beam, it becomes unclear which laser beam was used to acquire points within the node. This introduces the concept of eligibility of a node for angular coding.

In one example, the angular eligibility of a volume (or its associated node) is determined as follows:

1. Compute the distance r of the center of the node from the reference location of the beam assembly.
2. Compute $\Delta\theta=E/r$, where E is the length of an edge of the cube (or the vertical size of a volume of any shape) associated with the node.
3. The node is eligible if $K\Delta\theta\le\Delta\theta_{min}=\min|\tan(\theta_{Li})-\tan(\theta_{Li+1})|$ where the minimum is taken for all adjacent beam pairs. This ensures that the angular size of the node is smaller than the angular delta between the angularly closest two beams. The factor K is used to provide a security margin. In at least some embodiments, the value of K is 2.

Figure 13:
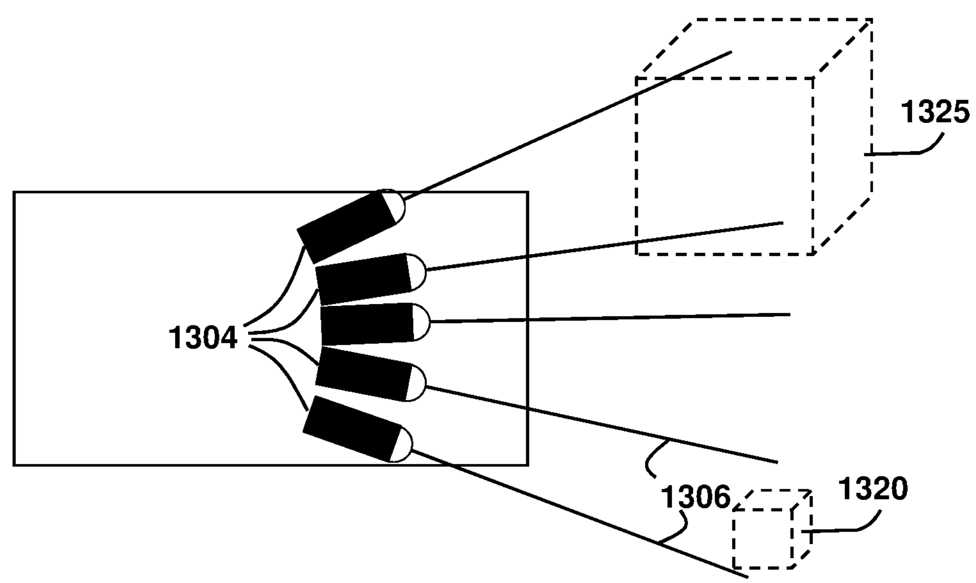
FIG. 13 shows examples of angular sizes of volumes of point cloud data relative to angle differences between beams emitted by the beam assembly.

FIG. 13 shows examples of an angular eligible volume and a volume that is not angular eligible. Namely, the size of volume 1325 and its distance from the beam assembly 1301 is such that it is sampled by multiple beams 1306 from multiple beam emitters 1304. On the other hand, the size of volume 1320 and its distance from the beam assembly is such that it is at most sampled by a single beam 1306.

In general, determining angular eligibility of a volume (or its associated node) may proceed by first determining a measure of an angular size of the volume as seen from a reference location of the beam assembly. The reference location may be the head's location, as noted above. The measure of angular size may relate to an angle under which an edge of the volume is seen from the reference location, and may be determined, for example, based on a length of the edge of the volume and a distance of (the reference location of) the volume to the reference location of the beam assembly. As such, the measure of angular size may be the angular size Δθ defined above, for example. Then, the measure of the angular size is compared to a measure of a difference angle between adjacent beams of the beam assembly, such as the difference angle $\Delta\theta_{min}$ defined above. That is, the difference angle may be the difference angle between the closest adjacent beams of the beam assembly. Finally, it is determined whether or not the volume is angular eligible based on a result of the comparison. For instance, determining angular eligibility may be based on whether the angular size is smaller than half the difference angle (or any other suitable fraction of the difference angle, to provide for a suitable safety margin).

Once angular eligibility has been determined, the beam L to which an angular eligible volume belongs can be determined, for example, by the following approach:

1. determine, from the position (x,y,z) of the reference location of the volume (e.g., the center of the volume), z and r relative to the beam assembly's position ($x_{Lidar}$, $y_{Lidar}$, $z_{Lidar}$)
2. compute the non-corrected angle tan(θ)=z/r $$\tan\theta=(z-z_{Lidar})/\sqrt{(x-x_{\mathrm{Lidar}})^2+(y-y_{\mathrm{Lidar}})^2}$$

3. determine which beam L the volume belongs to by finding the beam index L for which $|\tan(\theta)-\tan(\theta_L)|$ is minimum Once the beam L has been determined, the corrected angle may be computed by the formula of equation 4.

$$\tan\theta_{corr,L} = \frac{z - z_{Lidar} - z_L}{\left(\sqrt{(x - x_{Lidar})^2 + (y - y_{Lidar})^2} - r_L\right)} \quad (4)$$

or equation 5:

$$\tan\theta_{corr,L} \approx (z - z_{Lidar} - z_L)/\sqrt{(x - x_{Lidar})^2 + (y - y_{Lidar})^2} = \tan\theta - z_L/r \quad (5)$$

The second equality may be practically useful as it avoids computing another inverse square root.

In general, the following approach may be followed for determining the corrected angle $\theta_{corr}$ for a volume associated with a node. Initially, a first angle (e.g., elevation angle) is determined for a reference location within the volume, relative to a reference location of the beam assembly. The reference location within the volume may be the center of the volume, for example. The reference location of the beam assembly may be the center location of the beam assembly, for example. Based on the first elevation angle, a specific beam (or the corresponding beam emitter) L that is assumed to have acquired (or that has actually acquired) the points within the volume is determined. Next, an origin location (beam origin location) for that specific beam is determined or acquired. This may be done by any suitable approach described above. Having available the origin location of the specific beam, corrected elevation angles for sub-volumes or groups of sub-volumes (e.g., planes within the volume) can be determined relative to the origin location for the specific beam.

Angular Coding Mode

The angular coding mode has been introduced to profit from the characteristics of LiDAR-acquired point and obtain gains of compression. It may be used to enhance or replace the predictive information of the planeZPosition discussed above, by using the knowledge of $\tan(\theta_{corr,L})$ for angular eligible nodes.

Specifically, the angular coding mode uses angular information to select a context for improved compression. One method of angular coding is illustrated with respect to FIG. 14.

Figure 14:
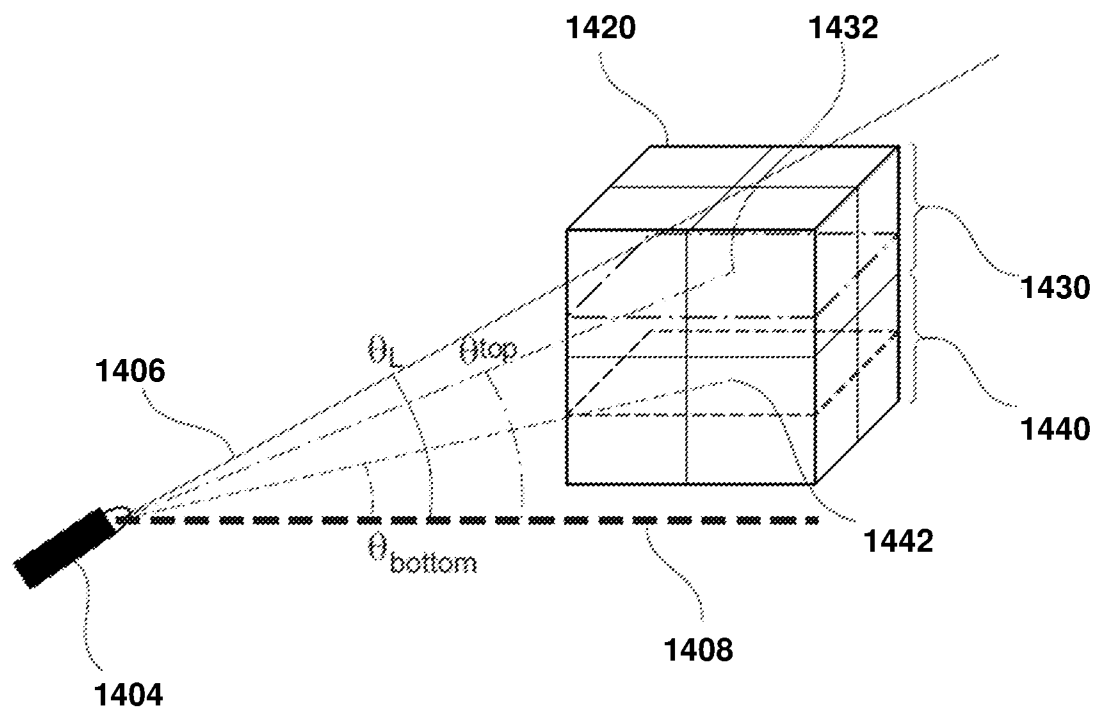
FIG. 14 shows examples of angles of groups of sub-volumes of a volume of point cloud data relative to a beam emitter.

As seen in FIG. 14, an eligible node 1420 is divided in a top horizontal plane 1430 and a bottom horizontal plane 1440, comprising the volume of the top four child nodes and the volume of the bottom four child nodes, respectively. At the middle of each of the top horizontal plane 1430 and the bottom horizontal plane 1440 are virtual planes 1432 and 1442. Top virtual plane and bottom virtual plane do not occupy the full volume of the child nodes, but are instead mere two-dimensional surfaces positioned at the middle of the child nodes.

Angles $\theta_{top,L}$ and $\theta_{bottom,L}$ are defined respectively as the corrected angles from a beam 1406 emitted by laser 1404 to the centers of the top virtual plane and the bottom virtual planes, respective to horizontal plane 1408. The angle $\theta_L$ is the corrected angle for the laser L that is assumed to have acquired (or that has actually acquired) the points within the eligible node. Corrected angles are understood as angles respective to the horizontal plane 1408 passing by location of the beam emitter possibly corrected from the reference location of the beam assembly by $z_L$ and or $r_L$. In some embodiments, the uncorrected angle may be used, however that may lead to worst compression results. Uncorrected angles are understood as angles respective to the horizontal plane 1408 passing by the reference location of the beam assembly. A context may then be determined from these angles, as described below.

The context is determined based on the following conditions:

1. Do $\Delta_{top}=\tan(\theta_L)-\tan(\theta_{top,L})$ and $\Delta_{bottom}=\tan(\theta_L)-\tan(\theta_{bottom,L})$ have the same sign?
2. Which of $|\Delta_{top}|$ and $|\Delta_{bottom}|$ is greater?
3. In what range is the value of $D=||\Delta_{top}|-|\Delta_{bottom}||/r$, where r is the distance between the laser and the eligible node in the horizontal plane? According to at least one embodiment, four different ranges can be used to select a context, for example, values less than 0.5, values between 0.5 and 1, between 1 and 1.5, or greater than 1.5.

From the above, condition 1 allows for two possibilities, condition 2 allows two possibilities, and condition 3 allows for four possibilities. Therefore the angular context may take one of 2×2×4=16 possible values.

The angular context determined as described above may be used independently or in combination with a planar context to select a context for the entropy encoder (or decoder).

Predicted Point Trees

Figure 20:
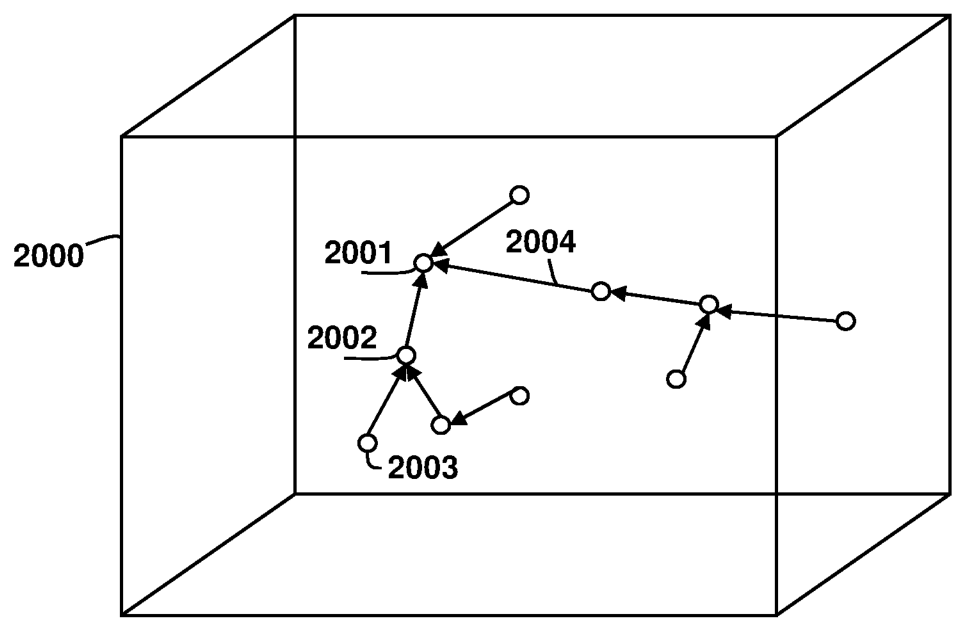
FIG. 20 illustrates a predicted-point tree for representing a point cloud.

A predicted-point tree is illustrated with respect to FIG. 20. Each node of the tree is illustrated by a circle, such as circles 2001, 2002, or 2003 and is associated with a point of the point cloud. Each arrow 2004 corresponds to a predictive branch of the tree, with the arrow pointing towards a parent node. In this example, the root node of the tree is node 2001, as it has no parent node. Node 2002 is an internal node of the tree, as it has a parent and at least one child node. Node 2003 is a leaf node, as it has no children.

Points associated with the nodes of the predicted-point tree belong to a part of the point cloud contained in volume 2000. The structure of the predicted-point tree is determined by the encoding process, in order to obtain an optimal structure in terms of maximum compression of the point cloud within volume 2000.

The (x,y,z) coordinates of a point associated with a node of the predicted-point tree are coded using the predicted-point tree coding structure by first determining predictive coordinates $(x_p,y_p,z_p)$ obtained from at least one point associated with an ancestor node or a sibling node, then subtracting the predictive coordinates from the coordinates to obtain residual coordinates, and finally coding the residual coordinates. Residual coordinates may be coded using an entropy coder.

Predictive coordinates $(x_p,y_p,z_p)$ may be obtained using a linear combination of the coordinates of points associated with ancestors or sibling nodes. The coefficients of the linear combinations may be selected from a set of possible linear combinations, and a selection index may be signaled. For instance, if $p_0$ is the coordinate of the point associated with the parent node, $p_1$ is the coordinate of the point associated with the grand-parent node, and $p_2$ is the coordinate of the point associated with the great-grand-parent node, some embodiments may use the following linear combinations.

$$P=0\times p_0+0\times p_1+0\times p_2 \text{(no prediction)}$$

$$P=1\times p_0+0\times p_1+0\times p_2 \text{(delta prediction)}$$

$$P=2\times p_0-1\times p_1+0\times p_2 \text{(linear prediction)}$$

$$P=2\times p_0+1\times p_1-1\times p_2 \text{(parallelogram prediction)}$$

The point associated with the root node, herein called root point, cannot be coded using predictive coordinates, and its coordinates are coded directly relative to volume 2000.

A Golomb Rice coding, an exp-Golomb coding, or another variable length coding approach can be used as an entropy coder for coding the residual coordinates. Alternatively, contextual arithmetic coding can also be used. Parameters of the entropy coder can be chosen depending on the linear combination or the distance between ancestors, such as for example, the average distance between parent and grand-parent, or the average distance between grand-parent and great-grand-parent.

The construction of the predicted point tree for a set of points may be performed as follows. In one embodiment, the encoder first selects one point from the set of points to be associated with the root node of the predicted point tree. This single root node is first considered as a leaf node because it has no child node yet. The selected point is removed from the set of points to be processed. Then, the encoder recursively selects a point from the set of points, associates the selected point with a node of the predicted point tree, and removes the selected point from the set of points to be processed. The recursive process ends when the set of points becomes empty.

In a variant, the encoder first identifies clusters of points and builds a predicted point tree for each cluster of points by taking the closest point to the center of the cluster as the root point and associating the other points of the cluster as its children. Then, the set of root points is considered as a new set of points to be clustered, and the process is applied recursively until the set of root points contains only one point. This variant is a bottom-up process that constructs the tree from the leaf nodes up to the root node.

The predictive structure of a predicted point tree is entirely determined by the prediction selection index associated with each node and the number of child nodes for each node. Point coordinates can then be obtained by the decoder from the predictive structure and the residual coordinates of each point. Thus, a bitstream signaling a predicted point tree is composed of the number of child nodes per node, the prediction selection index, and the residual coordinates for each node.

The scanning order of the tree may be performed following a predetermined coding order. For example, the scanning order of the predicted point tree may be performed following a depth-first traversal of the nodes. In another example, the scanning order of the predicted pont tree may be following a breadth-first traversal of the nodes.

In a variant, the number N of child nodes for a node is less than or equal to a maximum bound. The number N may be coded in the bitstream for each node, knowing the maximum bound, using a Golomb Rice coding, for example. The maximum bound may also be coded in the bitstream.

In another variant, the number of points being associated with child nodes of a node is fixed or deduced algorithmically from information available to the decoder. In such a case, there is no need to signal the number of child nodes for each node.

Problem

The present disclosure seeks to provide solutions for improved compression of point cloud data, as measured in compression rate and decoding time.

When IDCM is used, the tree is pruned at a node and no entropy coding of the points located in the node is performed. Specifically, in a pruned branch, the angular mode described above can not be used and does not provide compression benefits.

When an IDCM activation parameter is introduced, it is observed that the more IDCM is used, the faster the runtimes become, at the cost of less compression due to less use of the angular mode. In some cases, the angular mode coding described above has provided gains of more than 20% compression on LiDAR-acquired point clouds, however such gains are accompanied by a 250% increase in decoding time. Therefore, there is a need for an improved method of angular coding which maintains the compression gains while improving runtimes.

In a tree made of nodes associated with volumes, it is understood that the complexity is proportional to the product of the number of processed nodes, and the complexity per node. Therefore, the complexity may be reduced by reducing the number of nodes to be processed while using the angular method, or by simplifying the algorithm for processing a node.

Solutions

In a first solution, a simple version of the angular mode is used along with IDCM, in order to profit from most of the pruning of the tree provided by IDCM while also benefiting from the compression provided by the angular mode for all points, including those belonging to pruned branches of the tree, in the point cloud.

Furthermore, an additional condition is introduced for IDCM eligibility. Specifically, in prior approaches described above, IDCM was used only for nodes which contained points which were sufficiently isolated. In this solution, IDCM will be used for nodes which are sufficiently isolated, and which are eligible for the angular mode. As described above, in general terms a node is eligible for the angular mode if it can be determined with certainty which laser acquired the points within the volume associated with the node.

According to at least one embodiment of the present disclosure, a node will be subject to IDCM if both these conditions are met. In other words, a node which is sufficiently isolated but which is not eligible for the angular mode will not be subject to IDCM.

Consequently, IDCM is applied less frequently than otherwise, leading to slightly more nodes to process. However, this increase in nodes is small when dealing with very sparse point clouds as are typically obtained by LiDAR acquisition.

According to a first embodiment of the present disclosure, it is assumed that the main axis of the LiDAR device is vertical, and therefore parallel to the z axis. The more general case will be described below.

Furthermore, it will be appreciated from the above discussion that once IDCM is activated for a node, the laser index L associated with the node is known, as well as $\tan(\theta_L)$ for the laser associated with the laser index L. In at least some embodiments, the corrected position of the laser $(x_{Lidar}, y_{Lidar}, z_{Lidar}+z_L)$ is also known.

Figure 15:
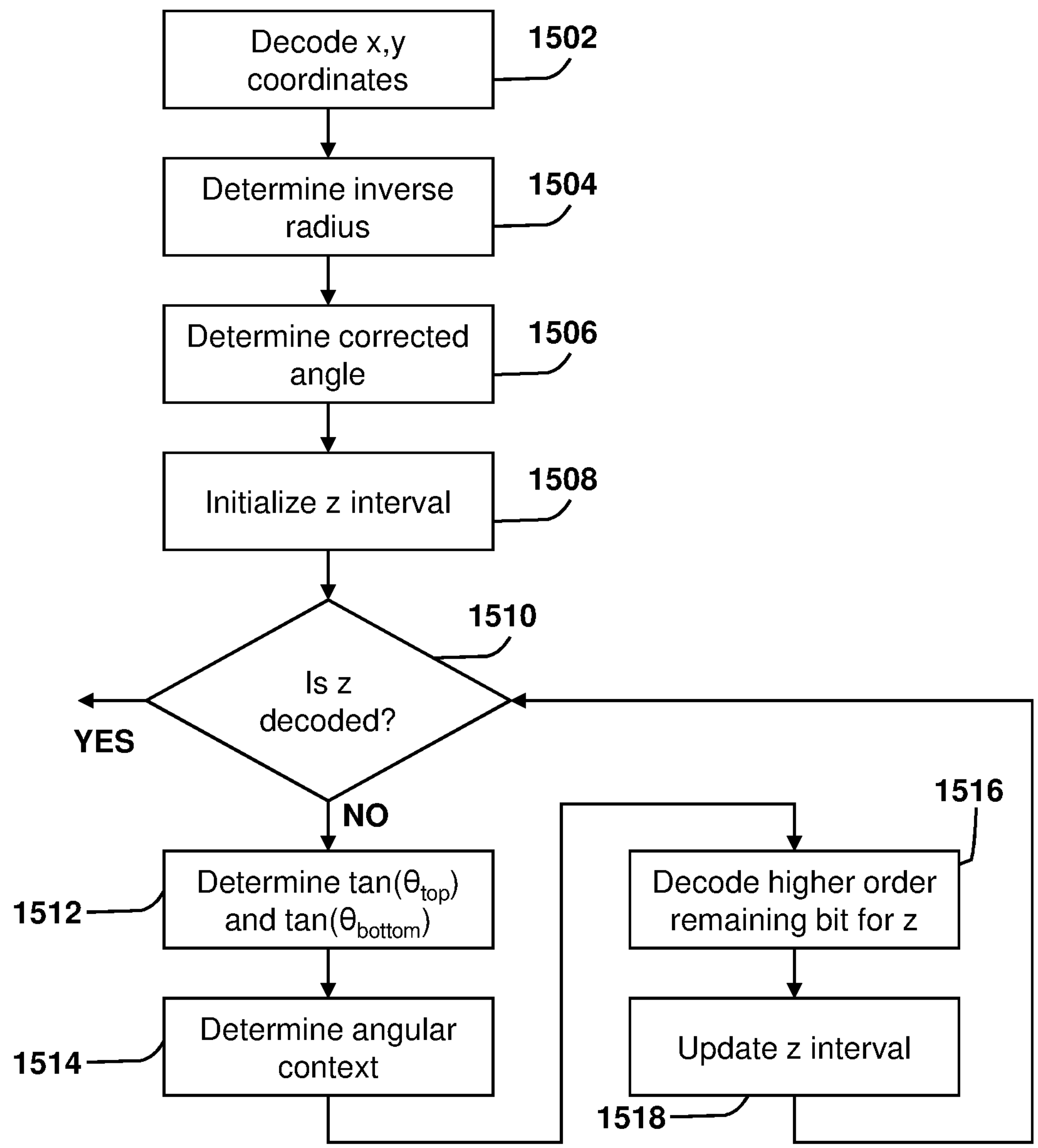
FIG. 15 shows, in flowchart form, one method of decoding point cloud data according to at least one embodiment of the present disclosure.

This solution is illustrated with respect to FIG. 15. Specifically, the method illustrated in FIG. 15 shows the decoding of a point according to at least one embodiment of the present disclosure.

At operation 1502, the x and y coordinates of the point are decoded. The x and y coordinates may be encoded and decoded in a variety of ways known to persons skilled in the art. Typically, the x and y coordinates may be encoded and decoded as for non-angular IDCM.

At operation 1504, the inverse of the azimuthal radius is computed from the x and y coordinates decoded at 1502, using the following equation 6. Advantageously, this operation need only be performed once per point to be decoded.

$$r_{inv} = \frac{1}{\sqrt{(x^2 + y^2)}} \tag{6}$$

Then, the corrected angle $\tan(\theta_{corr,L})$ is computed as described above at operation 1506. This step may be omitted in some embodiments and the value of $\tan(\theta_L)$ may be used instead, however this should lead to lower gains in compression. In at least one embodiment, $\tan(\theta_{corr,L})$ is computed as shown in equation 7:

$$\tan(\theta_{corr,L}) = \tan(\theta_L) + z_L r_{inv} \tag{7}$$

The correction term $+z_L r_{inv}$ is the opposite of the term that should be applied to non-corrected angles $\tan(\theta_{bottom})$ and $\tan(\theta_{top})$, which will be described below, to obtain corrected angles $\tan(\theta_{bottom,L})$ and $\tan(\theta_{top,L})$. Because this correction term is fixed, thanks to the knowledge of the coordinates x and y, for any given point, it is more efficient to correct the laser angle once, instead of correcting both the bottom and top angles multiple times.

At operation 1508, a z interval is initialized. In at least one embodiment, the z interval is initialized as $[z_{min}, z_{max}]$, where $z_{min}$ corresponds to the lowest possible value of z within the volume associated with the current node, and $z_{max}$ to the highest possible value of z within the volume associated with the current node.

At operation 1510, it is determined whether the coordinate z is completely decoded, i.e. whether there is no remaining bit to decode. A halting criterion may be the z interval having minimal length, e.g. its length is equal to 1 or equivalently $z_{min}=z_{max}$. If yes, the method proceeds to the next point. Otherwise, the method proceeds to operation 1512 to determine $\tan(\theta_{bottom})$ and $\tan(\theta_{top})$. Angles $\theta_{bottom}$ and $\theta_{top}$ are illustrated with respect to FIG. 16. In at least one embodiment, the computation may be performed with the following equations 8 and 9:

$$\tan(\theta_{bottom}) = z_{bottom} r_{inv} \tag{8}$$

$$\tan(\theta_{top}) = z_{top} r_{inv} \tag{9}$$

The values $z_{bottom}$ and $z_{top}$ are computed to correspond to one quarter of the way through the z interval and three quarters of the way through the z interval, respectively.

From the (tangent) values of $\theta_{bottom}$ and $\theta_{top}$, the angular context for entropy decoding may be determined at operation 1514, the higher order remaining bit (i.e. the higher bit not yet decoded) for z may be decoded at operation 1516 using this angular context for entropy decoding.

According to at least one embodiment, the context is determined from a possibility of 16 different contexts as a combination of the following:

1. Do $\Delta_{top}=\tan(\theta_{corr,L})-\tan(\theta_{top,L})$ and $\Delta_{bottom}=\tan(\theta_{corr,L})-\tan(\theta_{bottom,L})$ have the same sign?
2. Which of $|\Delta_{top}|$ and $|\Delta_{bottom}|$ is greater?
3. In what range is the value of $D=r_{inv}||\Delta_{top}|-|\Delta_{bottom}||$. According to at least one embodiment, four different ranges can be used to select a context, for example, values less than 0.5, values between 0.5 and 1, between 1 and 1.5, or greater than 1.5.

However, other methods of selecting the context may be possible, for example by using a subset of the combination described above. Once the angular context is determined, it may be used to decode the next bit for z, or it may be combined with other types of contextual information prior to decoding the next bit for z.

Figure 16:
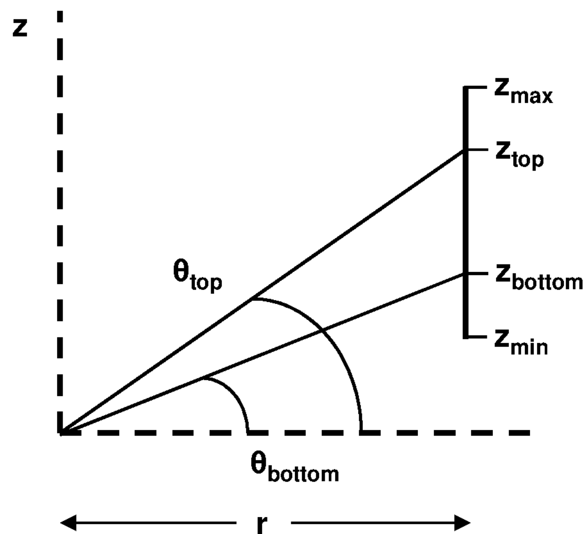
FIG. 16 illustrates angles based on an interval on the z axis.
Figure 17:
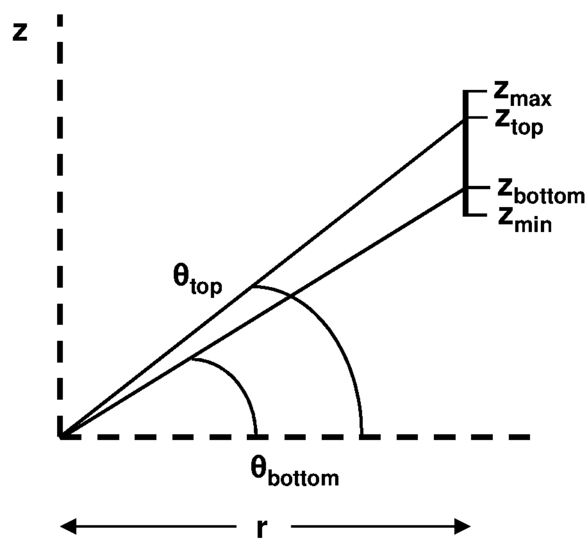
FIG. 17 illustrates angles based on an updated interval on the z axis.

Once the next bit for z is decoded, the z interval is updated based on the value of this decoded bit. For example, if the bit indicates that the z coordinate is in the upper half of the z interval (e.g., the bit is equal to 1), the new z interval is selected as the upper half of the previous z interval. In general terms, the z interval is updated to the interval where the z coordinate is found, based on the information decoded so far. An example of an updated z interval is illustrated with respect to FIG. 17 in which the z interval of FIG. 16 is updated by using the example of the decoded bit being equal to 1. Bounds $z_{min}$, $z_{max}$, and angles $\theta_{bottom}$, $\theta_{top}$ are updated accordingly.

After the z interval has been updated, the method returns to operation 1510 to determine whether the z coordinate in completely decoded.

Figure 18:
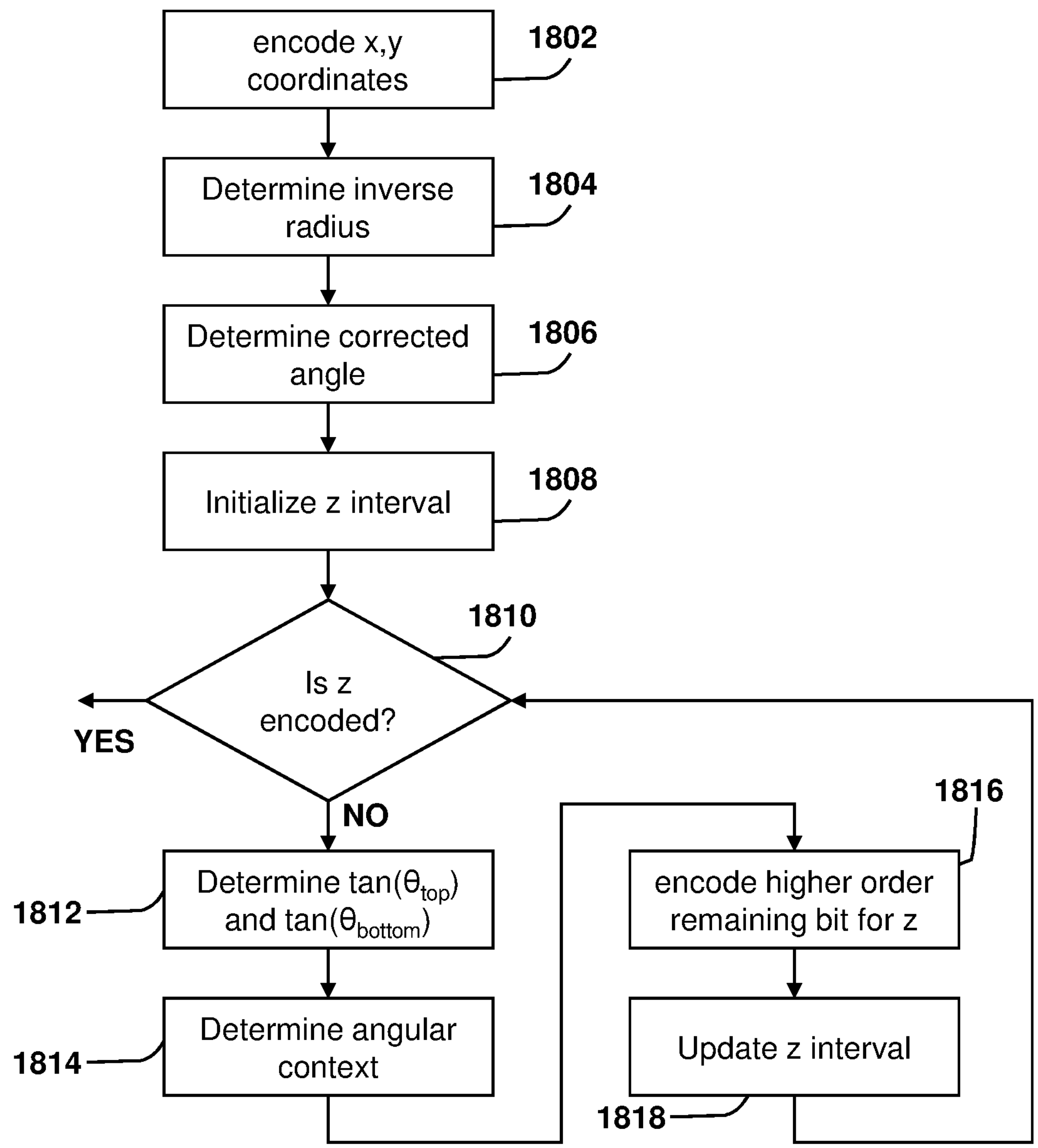
FIG. 18 shows, in flowchart form, one method of encoding point cloud data according to at least one embodiment of the present disclosure.

The encoding process is similar to the decoding process illustrated in FIG. 15, and is illustrated with respect to FIG. 18.

At operation 1802, the x and y coordinates of the point are encoded. The x and y coordinates may be encoded and decoded in a variety of ways known to persons skilled in the art. Typically, the x and y coordinates may be encoded and decoded as for non-angular IDCM.

At operation 1804, the inverse of the azimuthal radius is computed from the x and y coordinates, using the following equation 10. Advantageously, this operation need only be performed once per point to be encoded.

$$r_{inv} = \frac{1}{\sqrt{(x^2 + y^2)}} \tag{10}$$

Then, the corrected angle $\tan(\theta_{corr,L})$ is computed as described above at operation 1806. This step may be omitted in some embodiments and the value of $\tan(\theta_L)$ may be used instead, however this should lead to lower gains in compression. In at least one embodiment, $\tan(\theta_{corr,L})$ is computed as shown in equation 11.

$$\tan(\theta_{corr,L}) = \tan(\theta_L) + z_L r_{inv} \tag{11}$$

At operation 1808, a z interval is initialized. In at least one embodiment, the z interval is initialized as $[z_{min}, z_{max}]$, where $z_{min}$ corresponds to the lowest possible value of z within the volume associated with the current node, and $z_{max}$ to the highest possible value of z within the volume associated with the current node.

At operation 1810, it is determined whether the coordinate z is completely encoded, i.e. whether there is no remaining bit to decode. A halting criterion may be the z interval having minimal length, e.g. its length is equal to 1 or equivalently $z_{min}=z_{max}$. If yes, the method proceeds to the next point. Otherwise, the method proceeds to operation 1812 to determine $\tan(\theta_{bottom})$ and $\tan(\theta_{top})$. Angles $\theta_{bottom}$ and $\theta_{top}$ are illustrated with respect to FIG. 16. In at least one embodiment, the computation may be performed with the following equations 12 and 13:

$$\tan(\theta_{bottom}) = z_{bottom} r_{inv} \tag{12}$$

$$\tan(\theta_{top}) = z_{top} r_{inv} \tag{13}$$

The values $z_{bottom}$ and $z_{top}$ are computed to correspond to one quarter of the way through the z interval and three quarters of the way through the z interval, respectively.

From the (tangent) values of $\theta_{bottom}$ and $\theta_{top}$, the angular context for entropy coding may be determined at operation 1814, the higher order remaining bit (i.e. the higher bit not yet encoded) for z may be encoded at operation 1816 using this angular context for entropy coding.

According to at least one embodiment, the context is determined from a possibility of 16 different contexts as a combination of the following:

1. Do $\Delta_{top}=\tan(\theta_{corr,L})-\tan(\theta_{top,L})$ and $\Delta_{bottom}=\tan(\theta_{corr,L})-\tan(\theta_{bottom,L})$ have the same sign?
2. Which of $|\Delta_{top}|$ and $|\Delta_{bottom}|$ is greater?
3. In what range is the value of $D=r_{inv}||\Delta_{top}|-|\Delta_{bottom}||$. According to at least one embodiment, four different ranges can be used to select a context, for example, values less than 0.5, values between 0.5 and 1, between 1 and 1.5, or greater than 1.5.

However, other methods of selecting the context may be possible, for example by using a subset of the combination described above. Once the angular context is determined, it may be used to encode the next bit for z, or it may be combined with other types of contextual information prior to encoding the next bit for z.

Once the next bit for z is encoded, the z interval is updated based on the value of the last encoded bit. For example, if the bit indicates that the z coordinate is in the upper half of the z interval (e.g., the bit is equal to 1), the new z interval is selected as the upper half of the previous z interval. In general terms, the z interval is updated to the interval where the z coordinate is found, based on the information encoded so far. An example of an updated z interval is illustrated with respect to FIG. 17 in which the z interval of FIG. 16 is updated by using the example of the encoded bit being equal to 1. Bounds $z_{min}$, $z_{max}$, and angles $\theta_{bottom}$, $\theta_{top}$ are updated accordingly.

After the z interval has been updated, the method returns to operation 1810 to determine whether the z coordinate in completely encoded.

The above methods for encoding and decoding a node of a tree representing a point cloud are applicable when the axis of the LiDAR head used to acquire the point cloud is vertical. The following methods are applicable more generally, regardless of the orientation of the LiDAR head.

Figure 19:
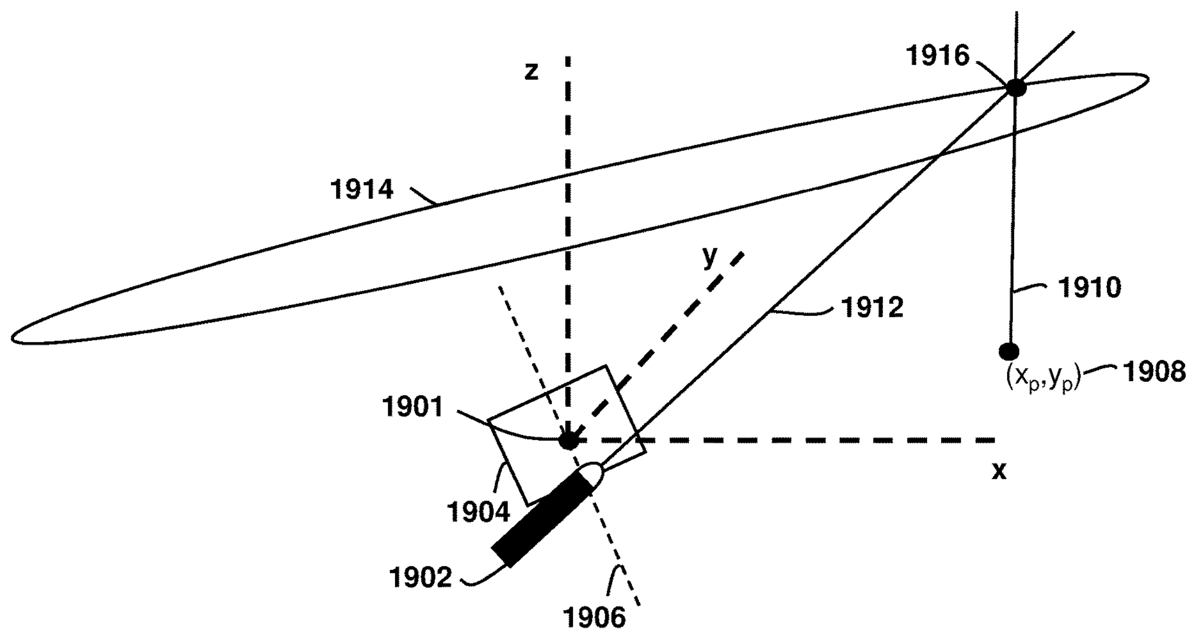
FIG. 19 illustrates a case where the LiDAR head is not aligned with the z axis.

Such a situation is illustrated with respect to FIG. 19. A laser 1902 on a LiDAR head 1904 which is oriented with respect to axis 1906 sends a beam 1912. Point 1908 having coordinates $(x_p, y_p)$ corresponds to the x and y coordinates of a point which is being either decoded or encoded. Once coordinates $(x_p, y_p)$ are known, for example by a preceding encoding or decoding of these coordinates of the point, the full coordinates (x,y,z) of the point to be encoded or decoded are restricted to be on vertical line 1910.

In this embodiment, the angle $\tan(\theta_{corr,L})$ is computed from the coordinates of point 1908 as well as from $\tan(\theta_L)$ and the location of the laser 1902. Specifically, the angle to be computed is the elevation angle, along the z axis, of the laser when pointing towards line 1910.

When rotating, the LiDAR's head 1904 makes the laser 1902 rotate and the beam 1912 describes an open cone 1914. The vertical line 1910 passing by the point 1908 having azimuthal coordinates $(x_p, y_p)$ relative to origin 1901 corresponding to the center of LiDAR head 1904, intersects cone 1914 at a unique point 1916. Point 1916 corresponds to a unique laser position (during rotation of the head) leading to a unique laser beam 1912 intersecting the vertical line 1910 to which the point belongs.

To calculate $\tan(\theta_{corr,L})$, the origin 1901 is moved to the laser 1902 emitting position, for example by a translation of $z_L$ along the head axis 1906, and every coordinate (x,y,z) is changed to (x',y',z') by a 3D translation. In particular, point 1916 is translated from $(x_p, y_p, z_p)$ to $(x'_p, y'_p, z'_p)$, and a new radius r' may be computed from equation 14.

$$r'=\sqrt{(x'^2_P+y'^2_P)} \tag{14}$$

The corrected laser angle may be computed from equation 15.

$$\tan(\theta_{corr,L})=z'_p/r' \tag{15}$$

Once this angle is computed, the method for decoding and encoding is as illustrated in FIGS. 15 and 18, respectively, where the radius used is r' instead of r.

Angular Mode for Predicted Point Trees

Figure 21:
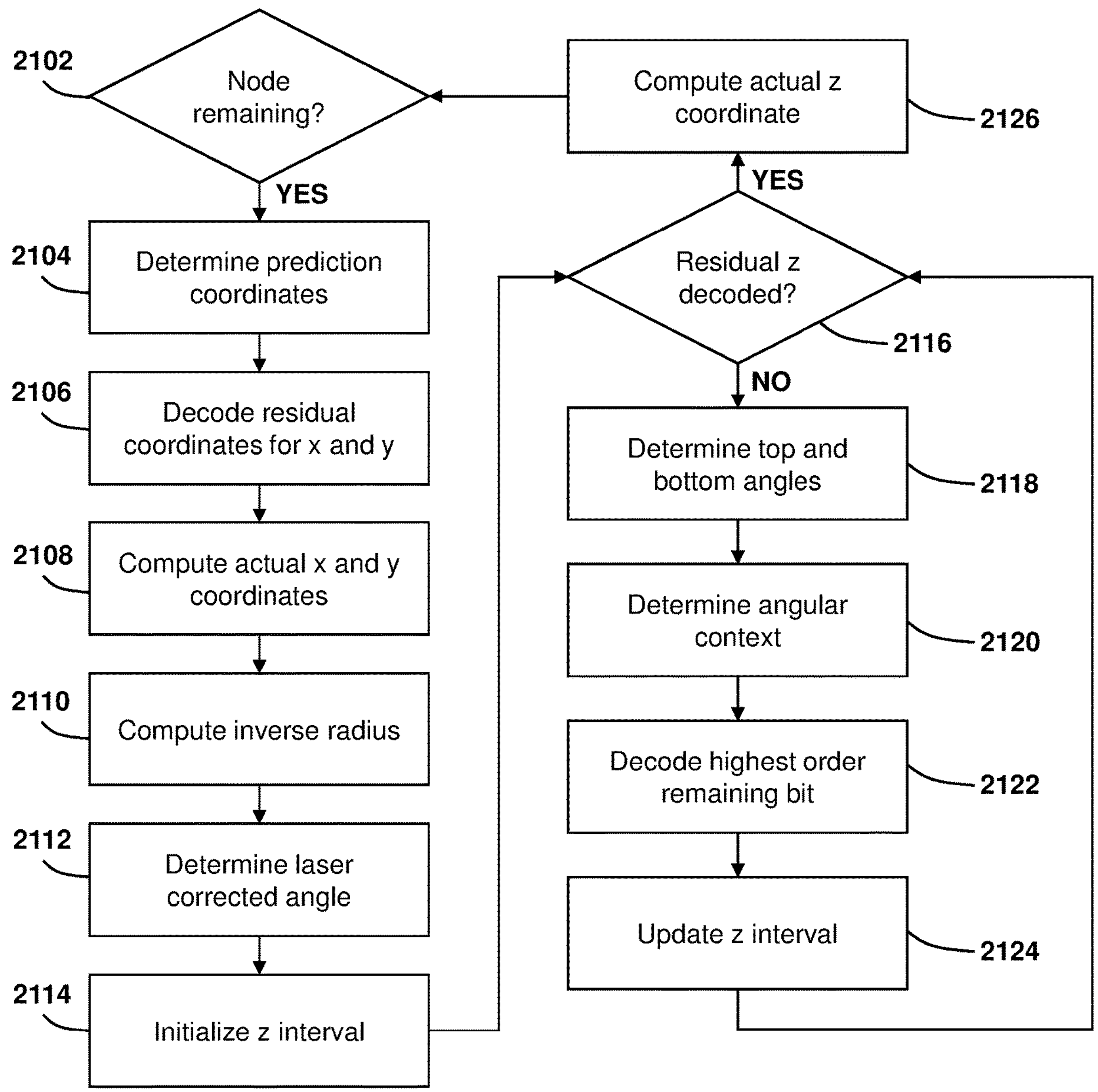
FIG. 21 shows, in flowchart form, one method of decoding point cloud data according to at least one embodiment of the present disclosure.

Reference is made to FIG. 21 which shows a method of decoding a predicted-point tree with the angular mode.

At operation 2102, it is determined if there are still nodes to decode. If yes, operation 2104 determines the prediction coordinates $(x_{pred}, y_{pred}, z_{pred})$ for x, y, and z. At operation 2106, the residual coordinates $x_{res}$ and $y_{res}$ for x and y are decoded, and at operation 2108, the prediction coordinates for x and y, and the residual coordinates for x and y, are combined to obtain the decoded coordinates $x_{dec}=x_{pred}+x_{res}$ and $y_{dec}=y_{pred}+y_{res}$ for x and y.

At operation 2110, the decoded $x_{dec}$ and $y_{dec}$ coordinates are used to compute the inverse radius, and at operation 2112 the corrected angle is computed using equation 11. This requires knowledge of which laser captured the point to obtain values $\theta_L$ and $z_L$. These values may be decoded from a dedicated information coded into the bitstream received by the decoder.

At operation 2114 the z interval is initialized. According to at least one embodiment, the z interval is initialized based on the predicted z coordinate $z_{pred}$ and the number of bits used to code the residual coordinate $z_{res}$. For example, if the predicted z coordinate $z_{pred}$ is 43, and 5 bits are used to encode the residual coordinates, the residual coordinate $z_{res}$ may take any value between [−15,16], and the z interval is [43−15,43+16]=[28,59].

At operation 2116, it is determined whether the residual z coordinate $z_{res}$ has been completely decoded, i.e. whether there is no remaining bit of $z_{res}$ to decode. A halting criterion may be the z interval having minimal length, e.g. its length is equal to 1. If yes, the decoded z coordinate is computed by $z_{dec}=z_{pred}+z_{res}$, i.e. by adding the decoded $z_{res}$ coordinate residual value to the predicted $z_{pred}$ coordinate value, at operation 2126 and the method returns to operation 2102. If no, the method proceeds to operation 2118 where the top and bottom angles are determined. The top and bottom angles may be selected at ¾ and ¼ of the z interval, respectively. Therefore, in the example above, where the z interval is [28,59], the top and bottom angles may be computed based on z coordinates 51 and 35, respectively.

Once the top and bottom angles are determined, an angular context may be selected at operation 2120. The angular context may be selected as described with respect to the method illustrated in FIG. 15. Alternative methods of selecting an angular context are also possible.

Then, at operation 2122, the highest order remaining bit for the z residual coordinate is decoded, and the z interval is updated at operation 2124. Specifically, the z interval is updated to the possible range of values for z given the already decoded bits. The method then returns to operation 2116.

A syntax signaling the number of bits for the coding of residual z coordinates may be coded in the bitstream. This syntax is decoded and the length of the initial z interval can be deduced from this number, as discussed above. This syntax may be coded using a unary variable length and/or an entropy coder.

More specifically, the residual z coordinate may be coded by an exp-Golomb-like variable length code where the prefix signals the number of bits of the suffix. The suffix itself signals the value of the residual $z_{res}$. When initializing the z interval, the prefix may be decoded, and the length of the interval may be deduced from the decoded prefix. The center of the interval may be provided by the predicted z coordinate $z_{pred}$. The suffix is decoded by the iterative process on the z interval.

For example, if z=32 and $z_{pred}$=43, then $z_{res}$=32−43=−11 is coded in the bitstream. The residual −11 belongs to the interval [−15,16], which has $32=2^5$ values, and can be coded using 5 bits. The encoder thus encodes the prefix 5 using a unary code, where each bit of the unary code is coded by a CABAC entropy coder. The bits of the suffix signal to which sub-interval the residual belongs to. For example, a first bit of 0 narrows the interval to [−15,0], a second bit of 0 narrows the interval to [−15,−8], a third bit of 1 narrows the interval to [−11,−8], a fourth bit 0 narrows the interval to [−11,−10], and a fifth bit of 0 finally narrows the interval to [−11,−11] that fulfills the halting criterion of the interval having a length equal to 1, and the coded value for $z_{res}$ is −11.

Figure 22:
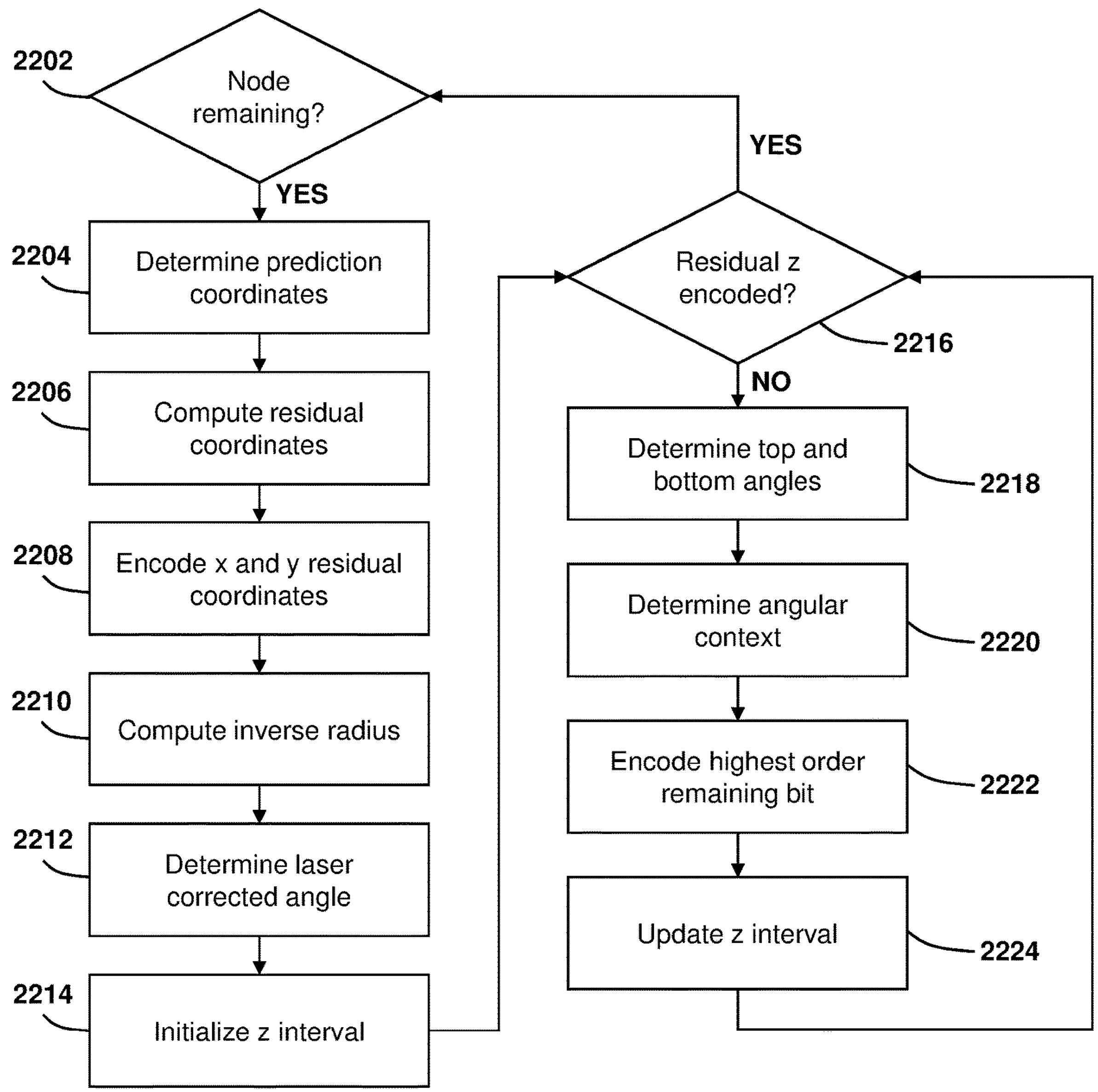
FIG. 22 shows, in flowchart form, one method of encoding point cloud data according to at least one embodiment of the present disclosure.

These five bits are coded by an entropy coder such as CABAC that uses the angular context determined during the methods of FIGS. 21 and 22.

During the decoding process discussed above, the second bit of the suffix may be inferred. For example, based on the example above, one may assume that the residual value for z does not belong to the [−7,8] because otherwise the number of bits signaled by the prefix would be 4 or less. This inference of the second bit may be performed regardless of the sign of the residual to code, and so this bit is not encoded.

Because the sign of the residual value is usually unpredictable, it is common to signal by a flag if the residual is zero, to code the sign by bypass coding and then to code the value of the magnitude $|z_{res}-1|$ of the residual. The encoding process for the residual $z_{res}$ then becomes:

1. Enode a flag $f_0$ to signal if $z_{res}$ is 0;
2. If $f_0$ is false:
   - 2.1 encode the sign of $z_{res}$ using bypass coding;
   - 2.2 encode the prefix to indicate the number of bits using a unary code, each bit of the unary code being coded by the CABAC entropy encoder;
   - 2.3 encode the remaining bits signaling to which sub-interval the residual belongs.

Reference is made to FIG. 22 illustrating a method for encoding corresponding to the decoding method illustrated in FIG. 21.

At operation 2202, it is determined if there are still nodes to encode. If yes, operation 2204 determines the prediction coordinates ($x_{pred}$, $y_{pred}$, $z_{pred}$) for x, y, and z. At operation 2206, the residual coordinates $x_{res}$ and $y_{res}$ for x and y are computed, and at operation 2208 the residual coordinates $x_{res}$ and $y_{res}$ for x and y are encoded.

At operation 2210, the coded x and y coordinates are used to compute the inverse radius, and at operation 2212 the corrected angle is computed using equation 11. This requires knowledge of which laser captured the point to obtain values $\theta_L$ and $z_L$. These values may be decoded from a dedicated information coded into the bitstream received by the decoder.

At operation 2214 the z interval is initialized. According to at least one embodiment, the z interval is initialized based on the predicted z coordinate $z_{pred}$ and the number of bits used to encode the residual coordinate $z_{res}$. For example, if the predicted z coordinate $z_{pred}$ is 43, and 5 bits are used to encode the residual coordinate $z_{res}$, the residual coordinate $z_{res}$ may take any value between [−15,16], and the z interval is [43−15,43+16]=[28,59].

At operation 2216, it is determined whether the residual z coordinates have been encoded, i.e. whether there is no remaining bit of $z_{res}$ to encode. A halting criterion may be the z interval having minimal length, e.g. its length is equal to 1. If yes, the method returns to operation 2202. If no, the method proceeds to operation 2218 where the top and bottom angles are determined. The top and bottom angles may be selected at ¾ and ¼ of the z interval, respectively. Therefore, in the example above, where the z interval is [28,59], the top and bottom angles may be computed based on z coordinates 51 and 35, respectively.

Once the top and bottom angles are determined, an angular context may be selected at operation 2220. The angular context may be selected as described with respect to the method illustrated in FIG. 15. Alternative methods of selecting an angular context are also possible.

Then, at operation 2222, the highest order remaining bit for the z residual coordinate is encoded, and the z interval is updated at operation 2124. Specifically, the z interval is updated to the possible range of values for z given the already encoded bits. The method then returns to operation 2216.

Exemplary Encoder and Decoder

Figure 23:
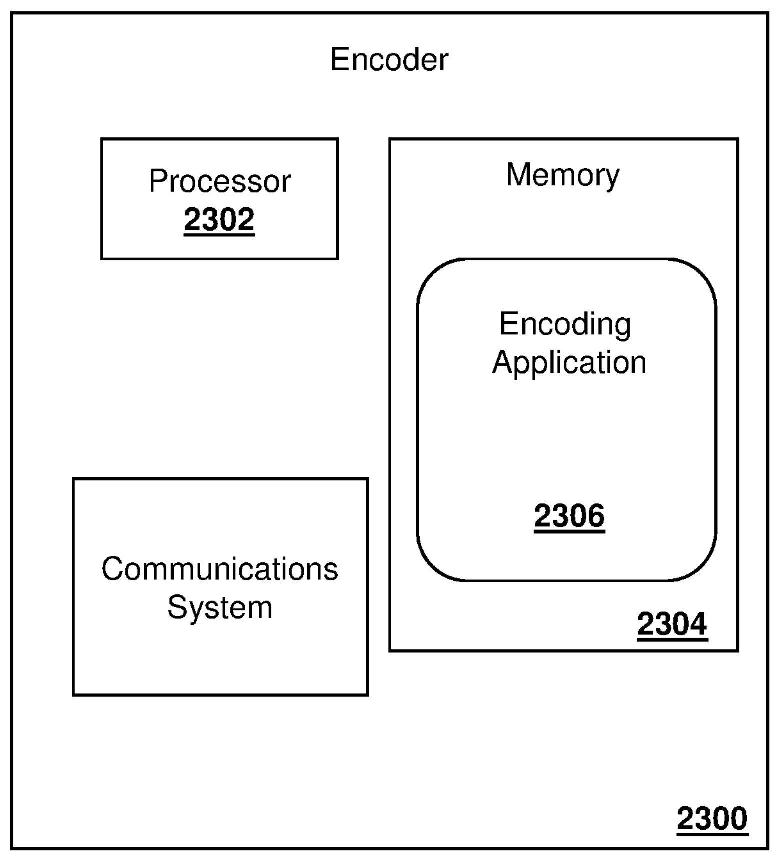
FIG. 23 shows an example simplified block diagram of an encoder.

Reference is now made to FIG. 23, which shows a simplified block diagram of an example embodiment of an encoder 2300. The encoder 2300 includes a processor 2302, memory 2304, and an encoding application 2306. The encoding application 2306 may include a computer program or application stored in memory 2304 and containing instructions that, when executed, cause the processor 2302 to perform operations such as those described herein. For example, the encoding application 2306 may encode and output bitstreams encoded in accordance with the processes described herein. It will be understood that the encoding application 2306 may be stored on a non-transitory computer-readable medium, such as a compact disc, flash memory device, random access memory, hard drive, etc. When the instructions are executed, the processor 2302 carries out the operations and functions specified in the instructions so as to operate as a special-purpose processor that implements the described process(es). Such a processor may be referred to as a “processor circuit” or “processor circuitry” in some examples.

Figure 24:
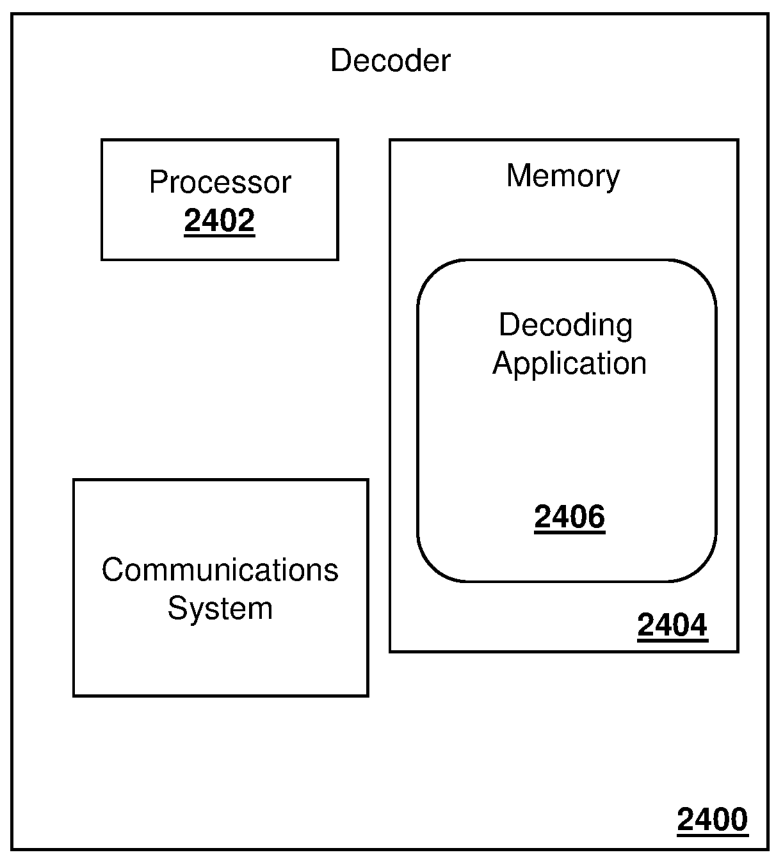
FIG. 24 shows an example simplified block diagram of a decoder.

Reference is now also made to FIG. 24, which shows a simplified block diagram of an example embodiment of a decoder 2400. The decoder 2400 includes a processor 2402, a memory 2404, and a decoding application 2406. The decoding application 2406 may include a computer program or application stored in memory 2404 and containing instructions that, when executed, cause the processor 2402 to perform operations such as those described herein. It will be understood that the decoding application 2406 may be stored on a computer-readable medium, such as a compact disc, flash memory device, random access memory, hard drive, etc. When the instructions are executed, the processor 2402 carries out the operations and functions specified in the instructions so as to operate as a special-purpose processor that implements the described process(es). Such a processor may be referred to as a “processor circuit” or “processor circuitry” in some examples.

It will be appreciated that the decoder and/or encoder according to the present application may be implemented in a number of computing devices, including, without limitation, servers, suitably-programmed general purpose computers, machine vision systems, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

The present application also provides for a computer-readable signal encoding the data produced through application of an encoding process in accordance with the present application.

Certain adaptations and modifications of the described embodiments can be made. Therefore, the above discussed embodiments are considered to be illustrative and not restrictive.

The invention claimed is:

1. A method of decoding a bitstream of compressed point cloud data representing a three-dimensional location of an object, for generating a point cloud data, the compressed point cloud being represented by a tree and being generated by a device comprising a plurality of beam emitters, the method comprising:

a) decoding a first coordinate and a second coordinate of a point belonging to a current node of the tree, and computing a radius from the first and second decoded coordinates;

b) determining a beam angle of a probing beam emitter, among the plurality of beam emitters, assumed to have acquired the point;

c) initializing a range of values to all possible values for a third coordinate of the point;

d) selecting a lower value and an upper value within the range of values, the lower value being selected from the lower half of the range and the upper value being selected from the upper half of the range;

e) computing a lower angle based on the lower value and the radius, and computing an upper angle based on the upper value and the radius;

f) selecting an angular context based on the lower angle, the upper angle and the beam angle; and g) decoding information, from the bitstream, representative of the third coordinate based on the angular context.

2. The method of claim 1, further comprising:

h) updating the range of values depending on the coded information representative of the third coordinate;

wherein steps d) to h) are repeated until the range of values comprises a single possible value.

3. The method of claim 1, wherein the beam angle is corrected to account for a position of the probing beam emitter.

4. The method of claim 3, wherein the position of the probing beam emitter is included in the bitstream.

5. The method of claim 1, further comprising, prior to step a):

determining that the current node is eligible for Inferred Direct Coding Mode (IDCM) and that a current node corresponds exclusively with the probing beam emitter.

6. The method of claim 1, wherein the current node is a node of a predicted point tree.

7. The method of claim 6, further comprising determining predictive coordinates for the point associated with the current node and wherein the first, second and third coordinates are residual coordinates of the point respective to the predictive coordinates.

8. The method of claim 7, wherein the range of values to all possible values for a third coordinate is initialized by:

determining the length of the range based on information coded in the bitstream; and determining the center of the range as the third coordinate of predictive coordinates.

9. The method of claim 1, wherein the lower value is selected to correspond to one quarter up the range and the upper value is selected to correspond to three quarters up the range.

10. The method of claim 1, wherein the beam angle of the probing beam emitter is included in the bitstream.

11. A decoder for decoding a bitstream of compressed point cloud data to produce a reconstructed point cloud representing a three-dimensional location of a physical object, the point cloud being represented by a tree and generated by a device comprising a plurality of beam emitters, the decoder comprising:

a processor;

a memory; and a decoding application containing instructions executable by the processor that, when executed, cause the processor to:

a) decode a first coordinate and a second coordinate of a point belonging to a current node of the tree, and compute a radius from the first and second decoded coordinates;

b) determine a beam angle of a probing beam emitter, among the plurality of beam emitters, assumed to have acquired the point;

c) initialize a range of values to all possible values for a third coordinate of the point;

d) select a lower value and an upper value within the range of values, the lower value being selected from the lower half of the range and the upper value being selected from the upper half of the range;

e) compute a lower angle based on the lower value and the radius, and computing an upper angle based on the upper value and the radius;

f) select an angular context based on the lower angle, the upper angle and the beam angle; and g) decode information, from the bitstream, representative of the third coordinate based on the angular context.

12. The decoder of claim 11, wherein the processer is further caused to:

h) update the range of values depending on the coded information representative of the third coordinate;

wherein the processor repeats d) to h) until the range of values comprises a single possible value.

13. The decoder of claim 11, wherein the beam angle is corrected to account for a position of the probing beam emitter.

14. The decoder of claim 11, wherein the processor is further caused to, prior to step a):

determine that the current node is eligible for Inferred Direct Coding Mode (IDCM) and that a current node corresponds exclusively with the probing beam emitter.

15. The decoder of claim 11, wherein the current node is a node of a predicted point tree.

16. The decoder of claim 11, wherein the processor is further caused to determine predictive coordinates for the point associated with the current node and wherein the first, second and third coordinates are residual coordinates of the point respective to the predictive coordinates.

17. The decoder of claim 16, wherein the range of values to all possible values for a third coordinate is initialized by:

determining the length of the range based on information coded in the bitstream; and determining the center of the range as the third coordinate of predictive coordinates.

18. The decoder of claim 11, wherein the lower value is selected to correspond to one quarter up the range and the upper value is selected to correspond to three quarters up the range.

19. The decoder of claim 11, wherein the beam angle of the probing beam emitter is included in the bitstream.

20. A non-transitory processor-readable medium storing processor-executable instructions for decoding a bitstream of compressed point cloud data to produce a reconstructed point cloud representing a three-dimensional location of a physical object, the point cloud being represented by a tree and generated by a device comprising a plurality of beam emitters, that, when executed by a processor, cause the processor to:

a) decode a first coordinate and a second coordinate of a point belonging to a current node of the tree, and compute a radius from the first and second decoded coordinates;

b) determine a beam angle of a probing beam emitter, among the plurality of beam emitters, assumed to have acquired the point;

c) initialize a range of values to all possible values for a third coordinate of the point;

d) select a lower value and an upper value within the range of values, the lower value being selected from the lower half of the range and the upper value being selected from the upper half of the range;

e) compute a lower angle based on the lower value and the radius, and computing an upper angle based on the upper value and the radius;

f) select an angular context based on the lower angle, the upper angle and the beam angle; and g) decode information, from the bitstream, representative of the third coordinate based on the angular context.

* * * * *